Jan. 20, 1953     W. H. BOKENKROGER ET AL     2,625,862
BAG HANDLE MAKING AND APPLYING MACHINE
Filed May 5, 1947     18 Sheets-Sheet 10
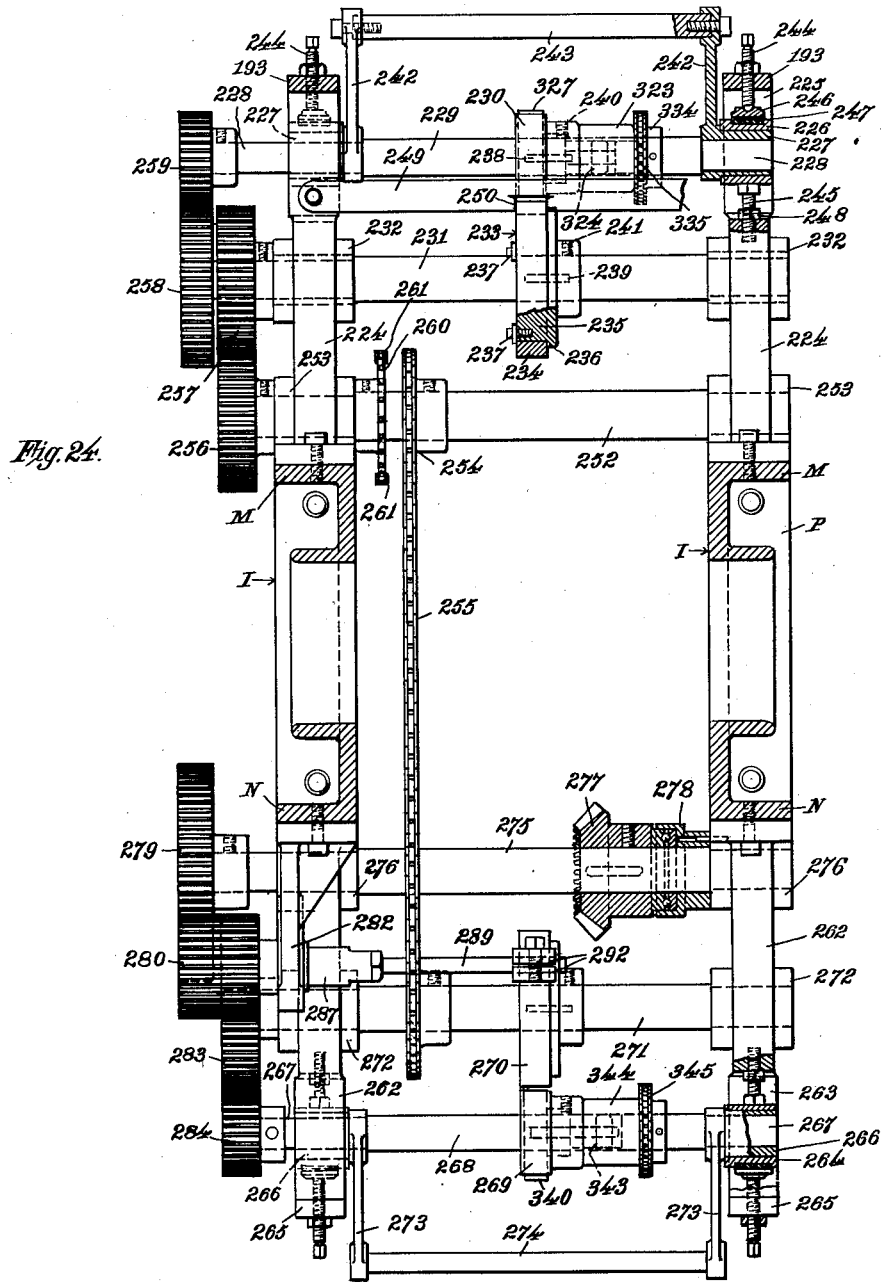
Fig. 24.
Fig. 25.
INVENTORS.
William H. Bokenkroger
True M. Avery
BY 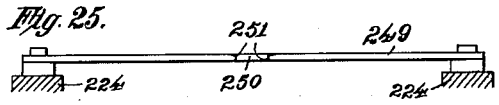
ATTORNEYS

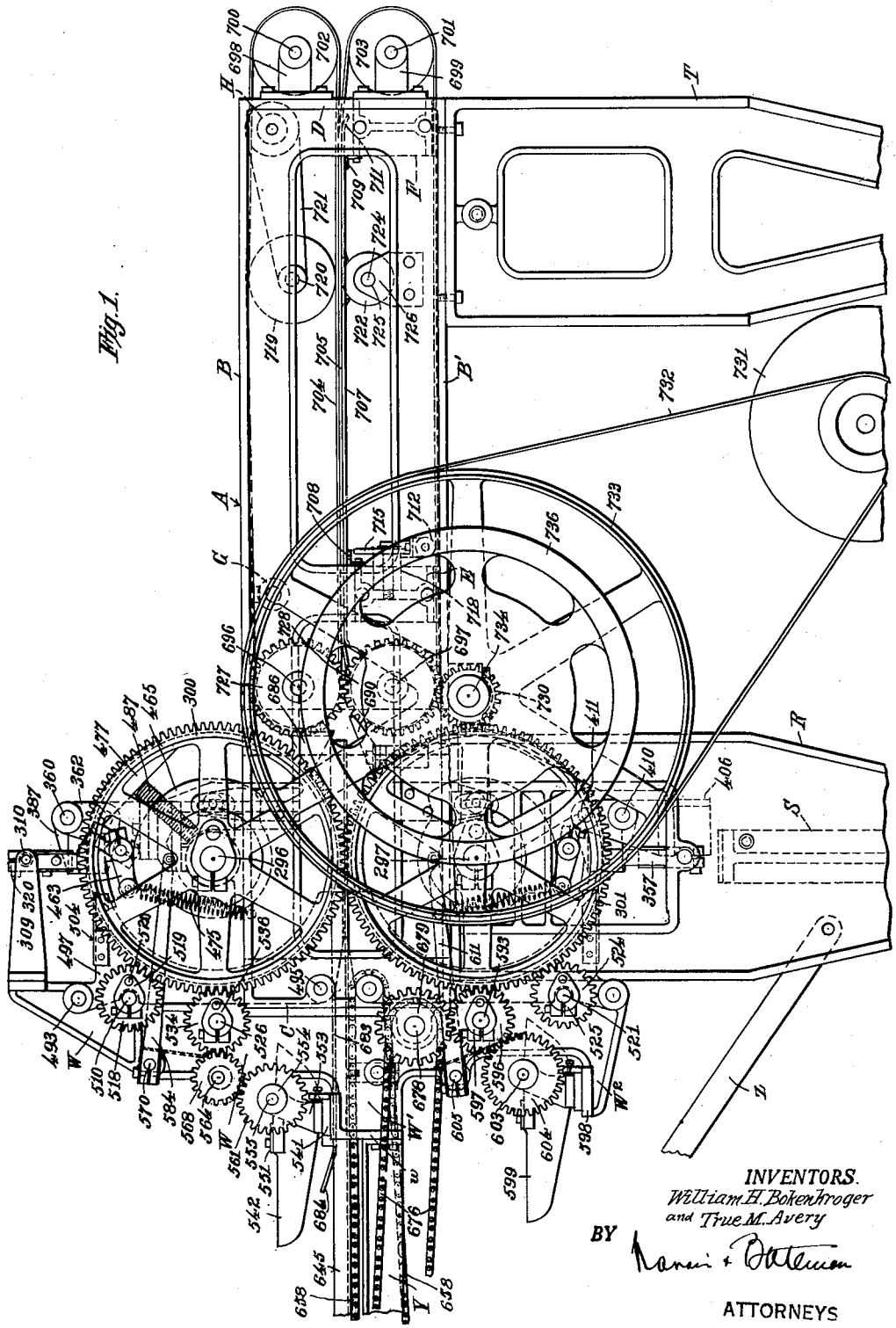

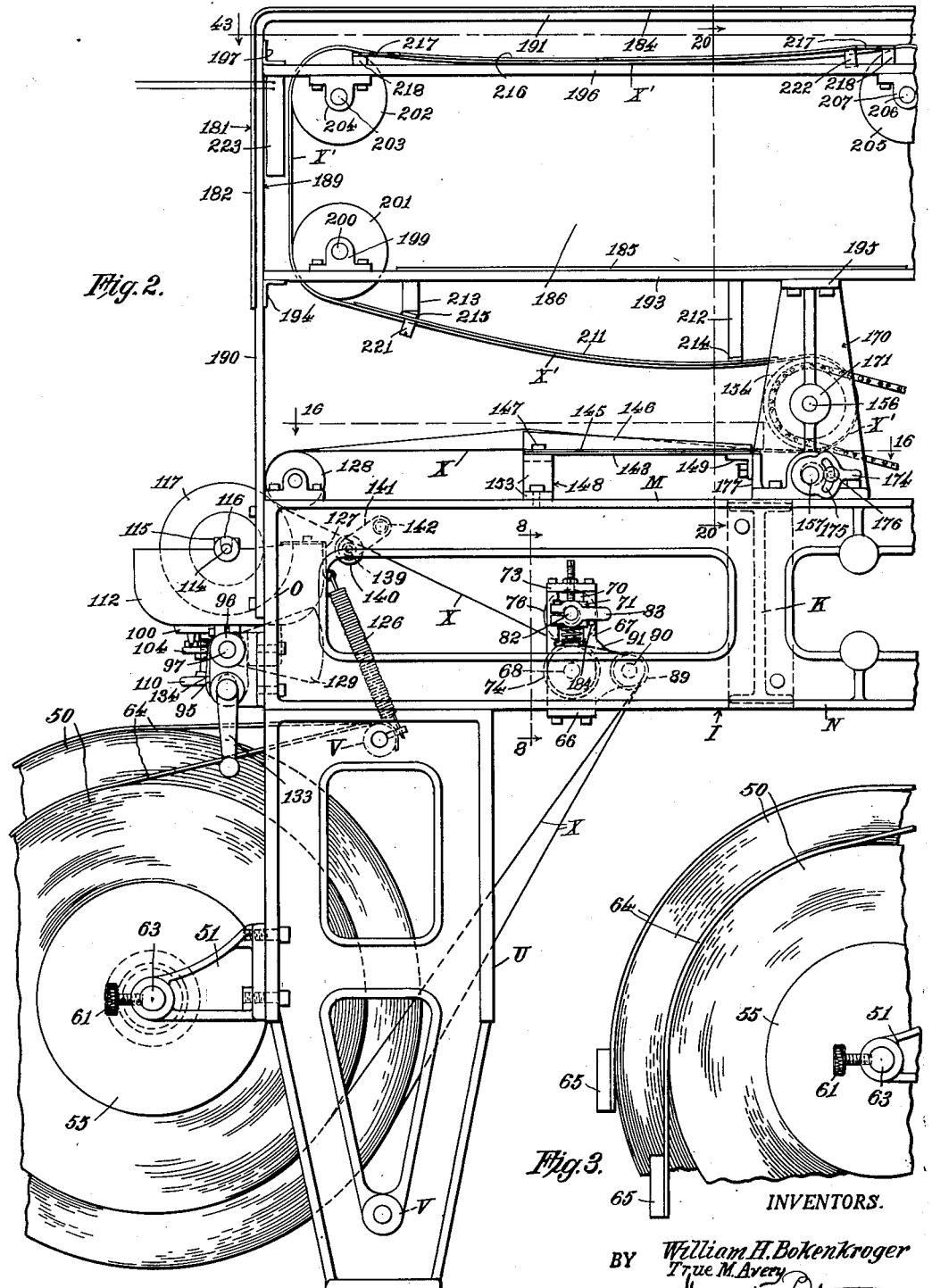

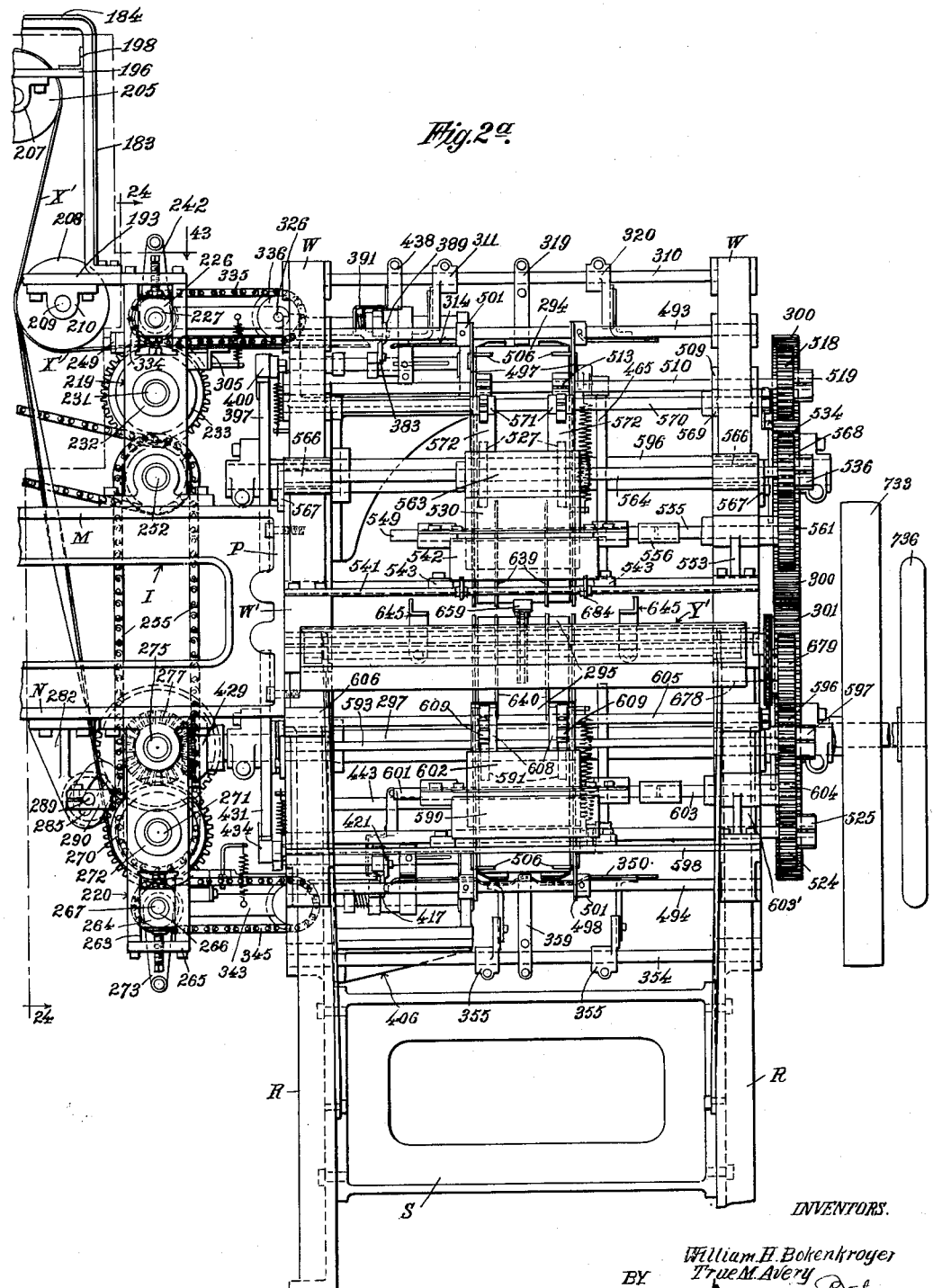

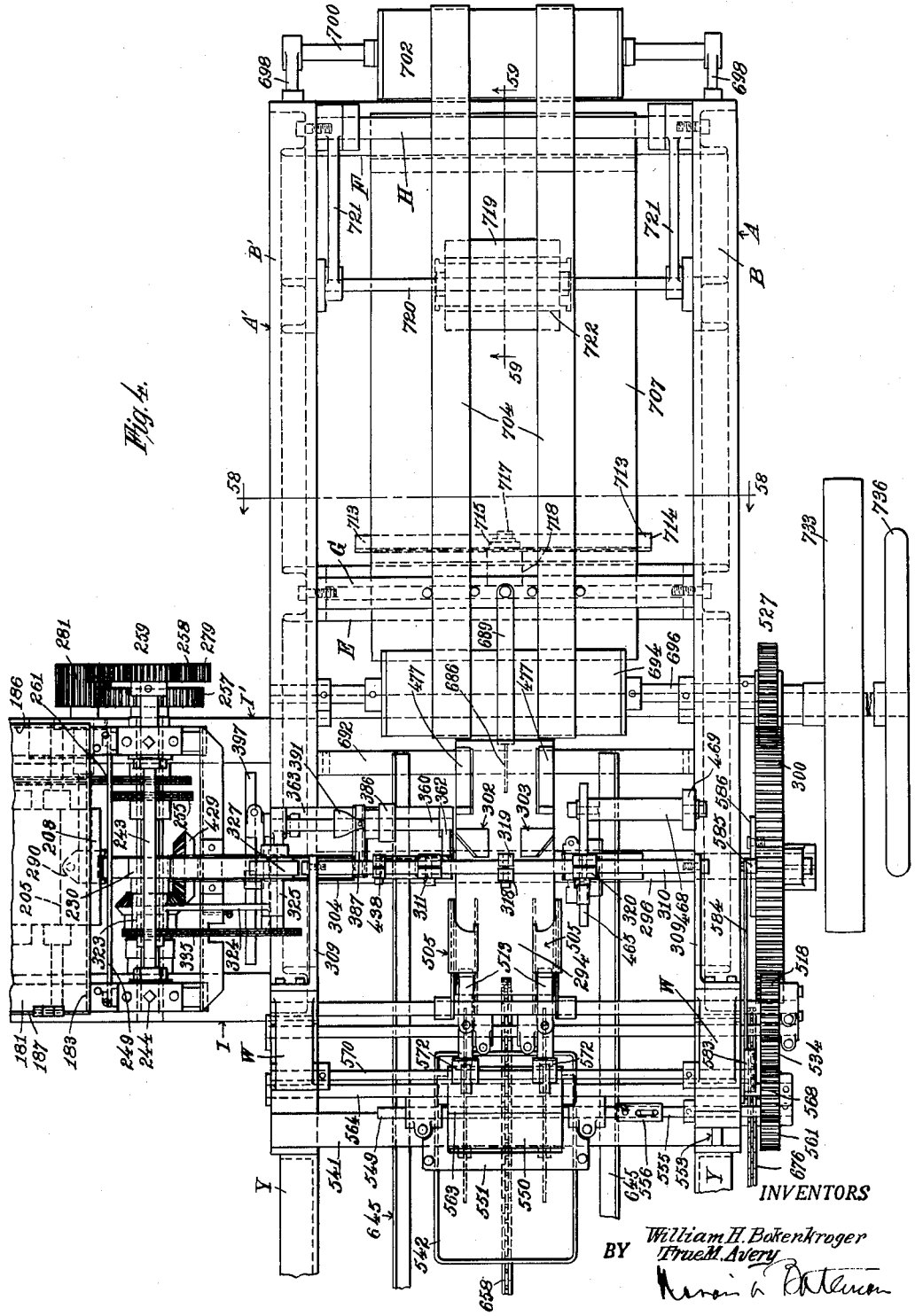

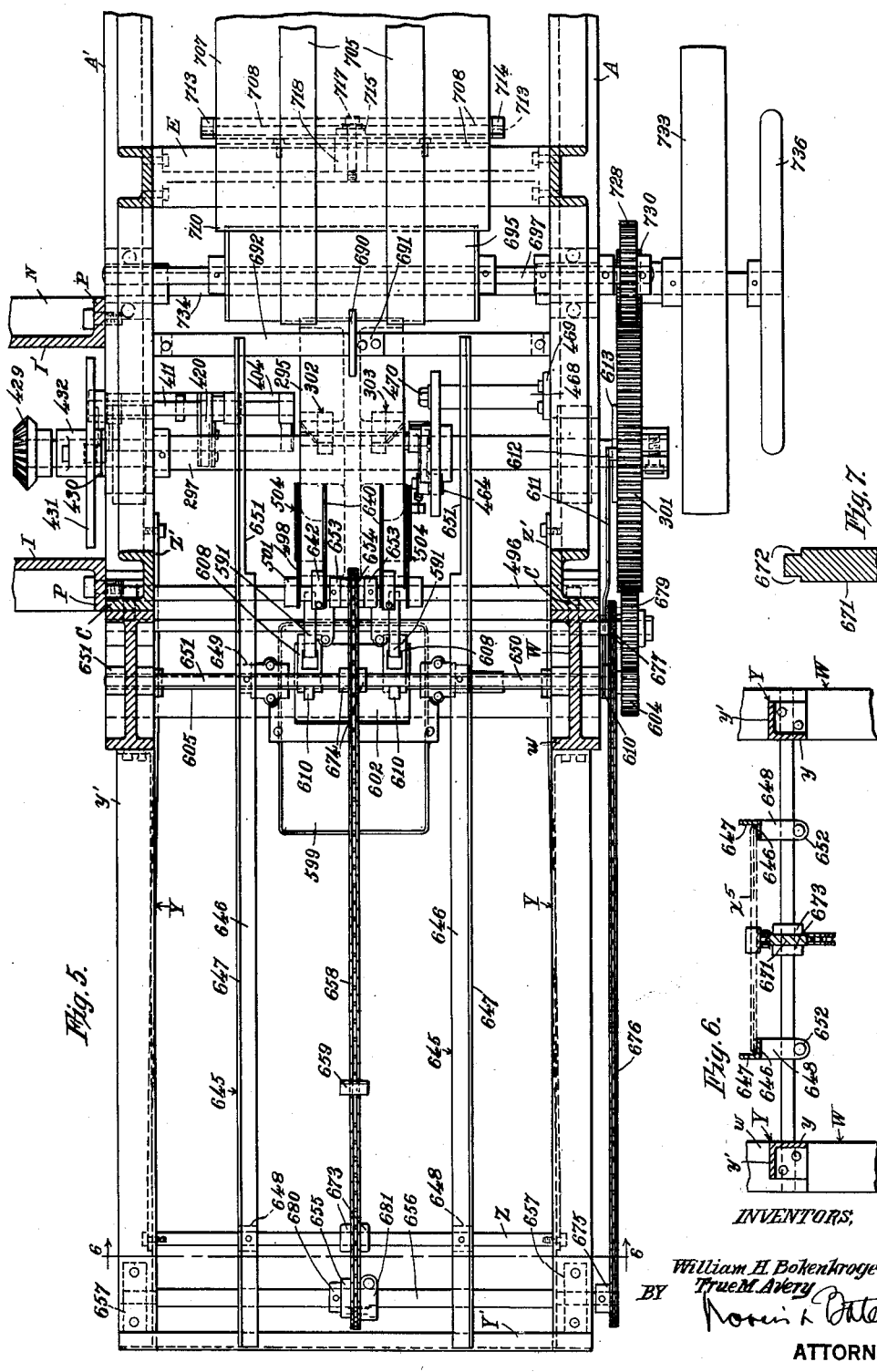

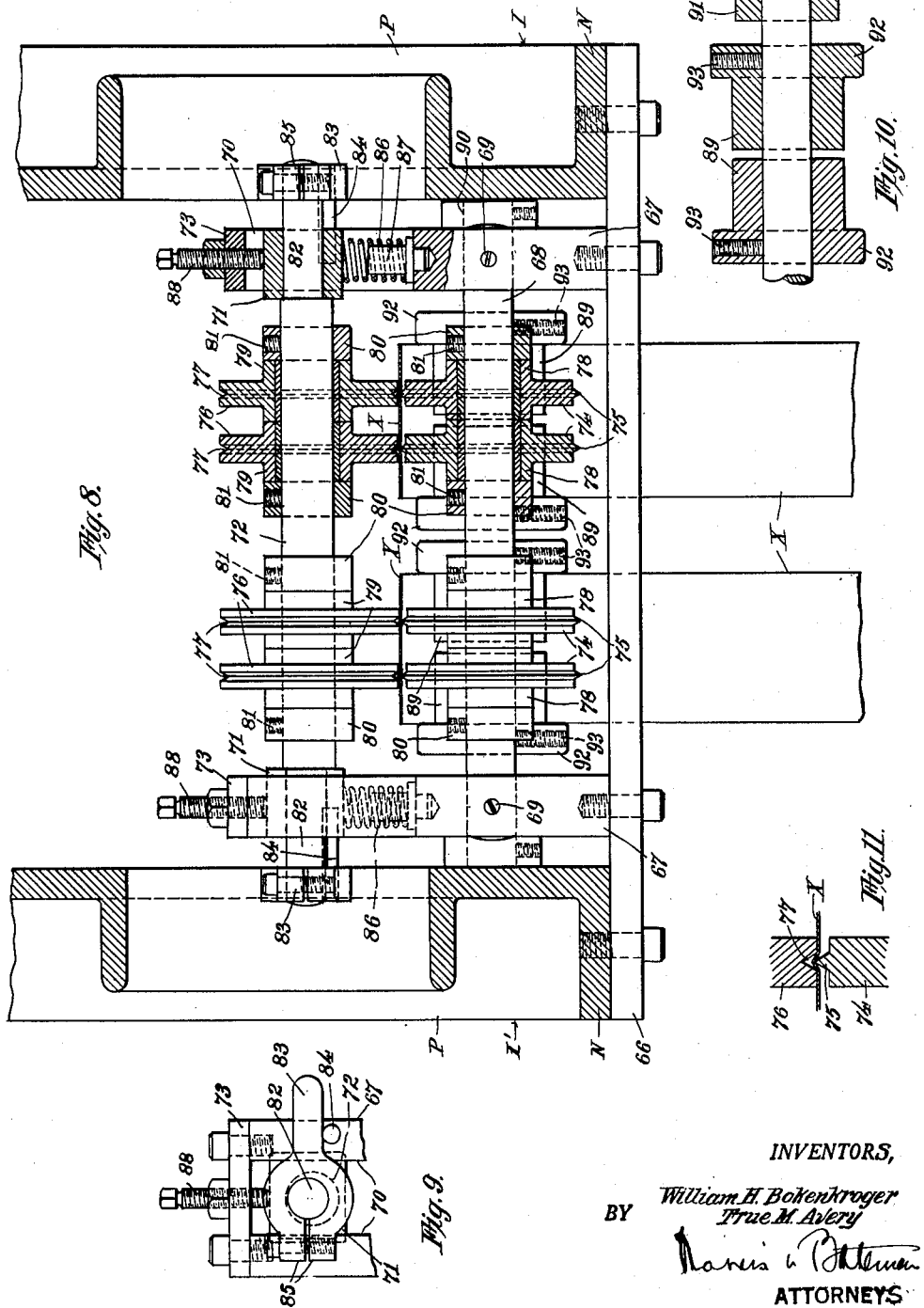

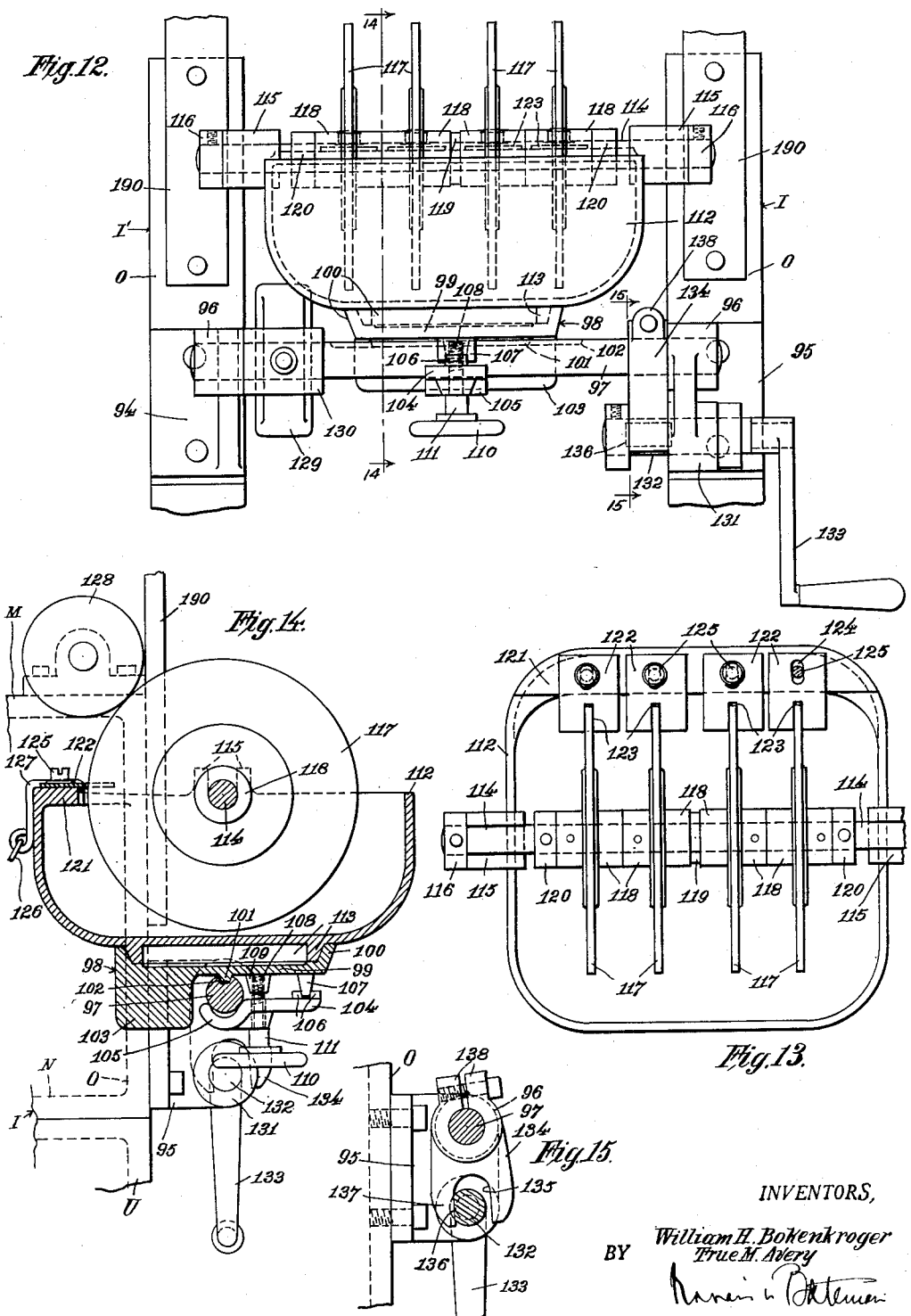

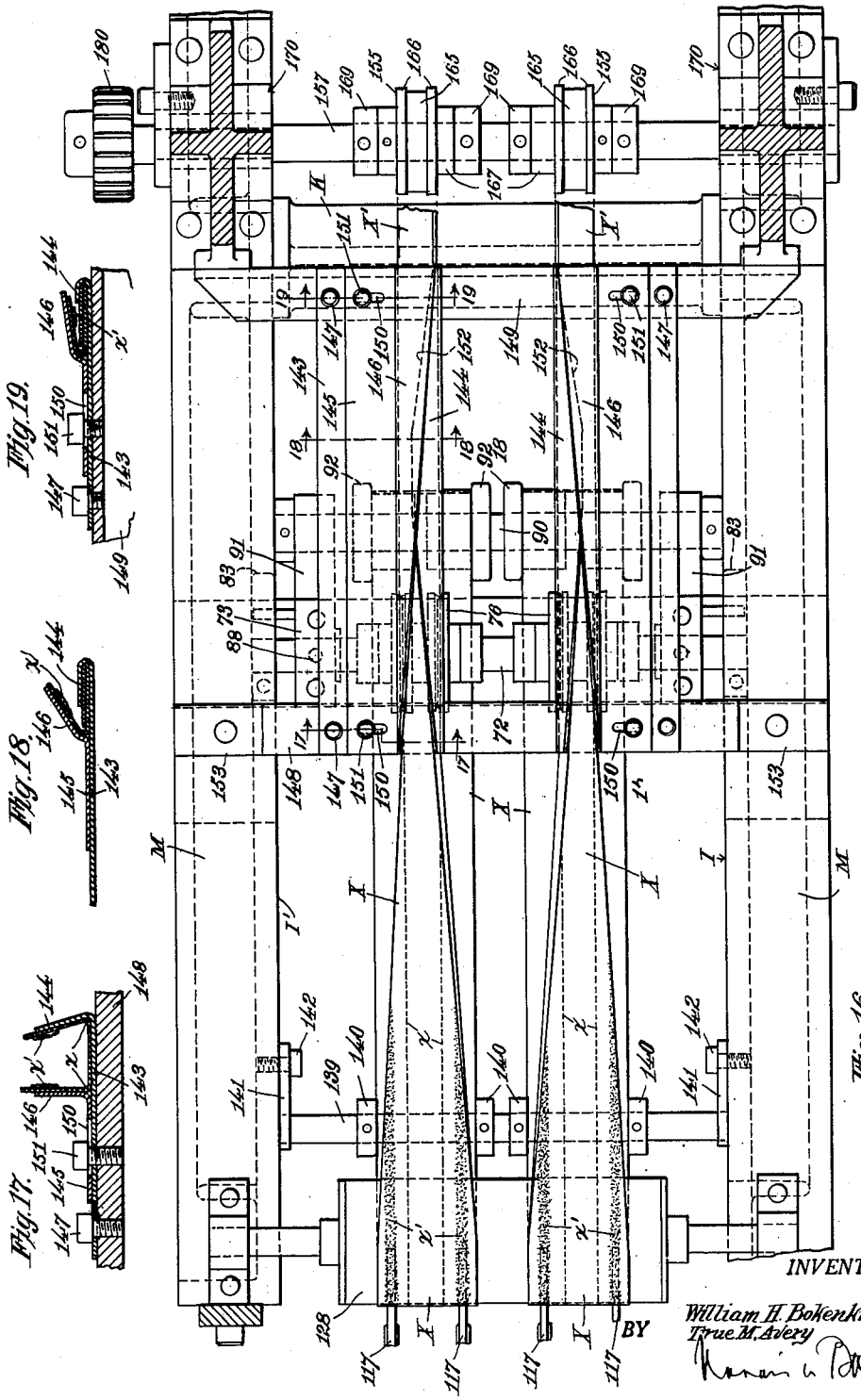

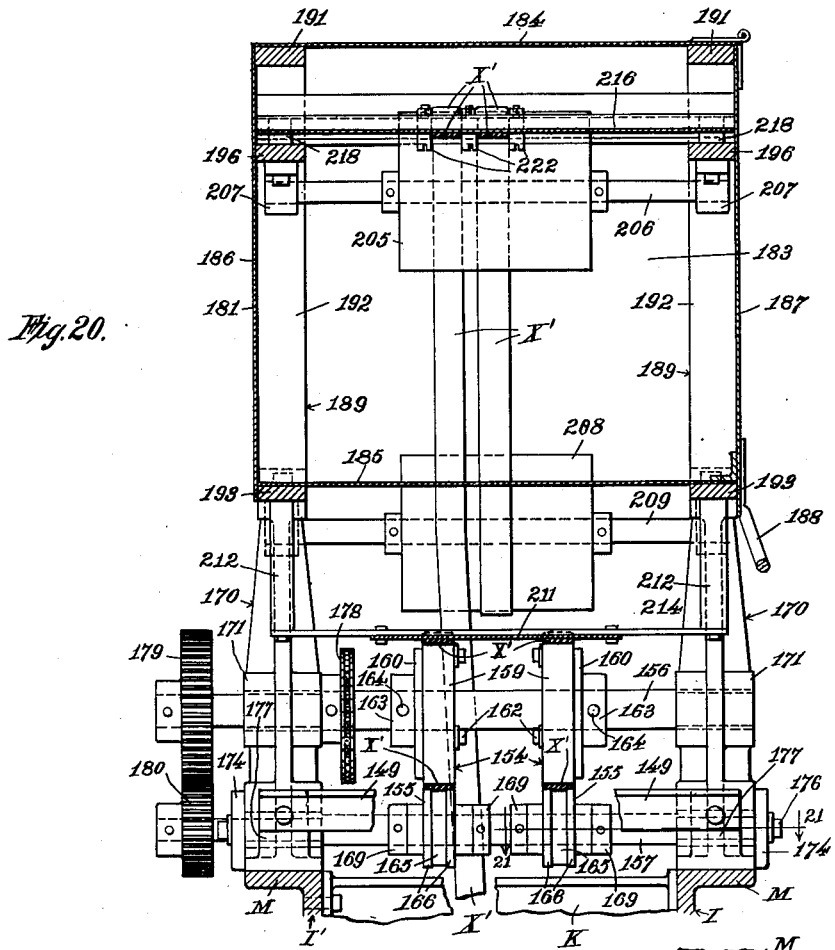

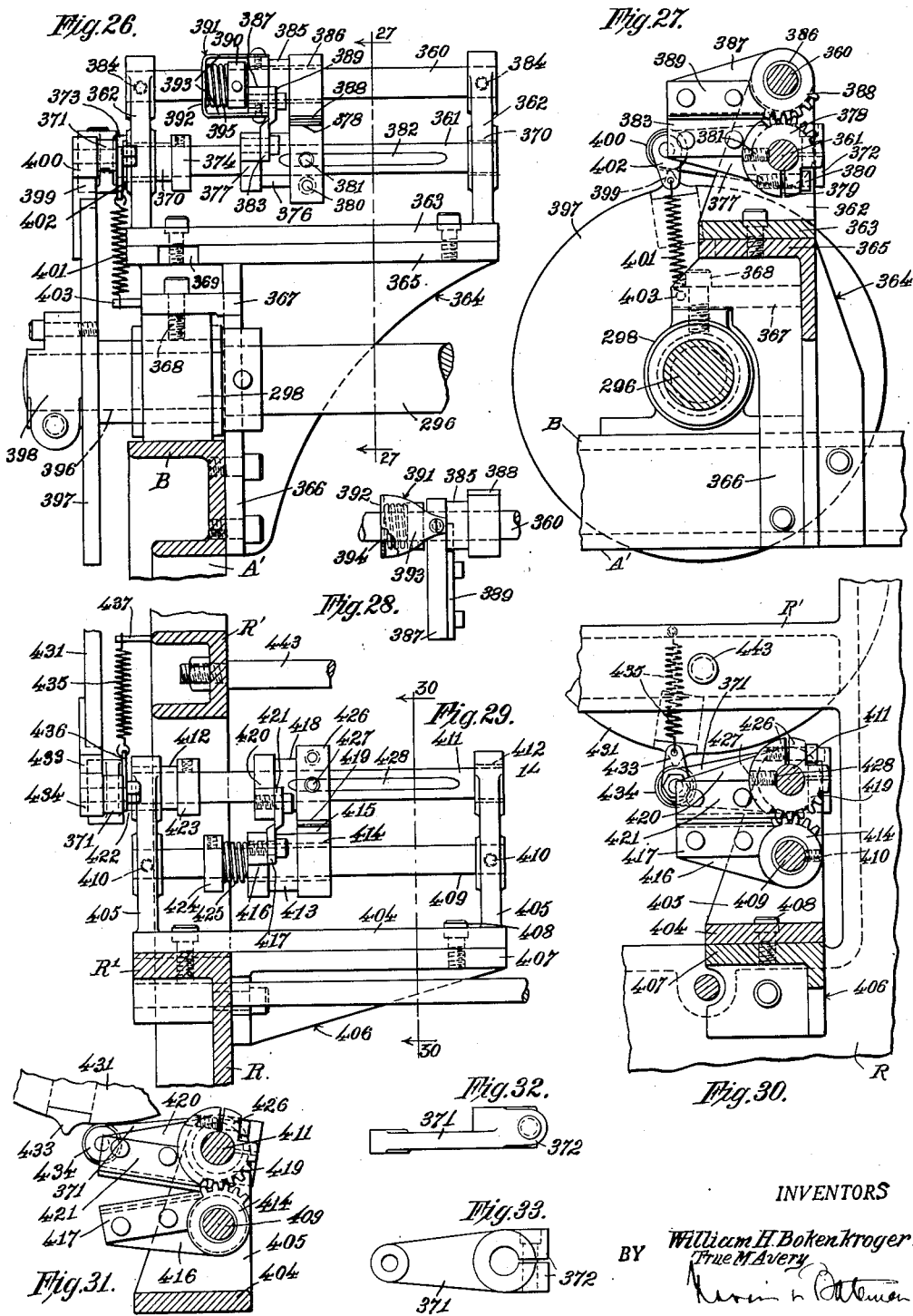

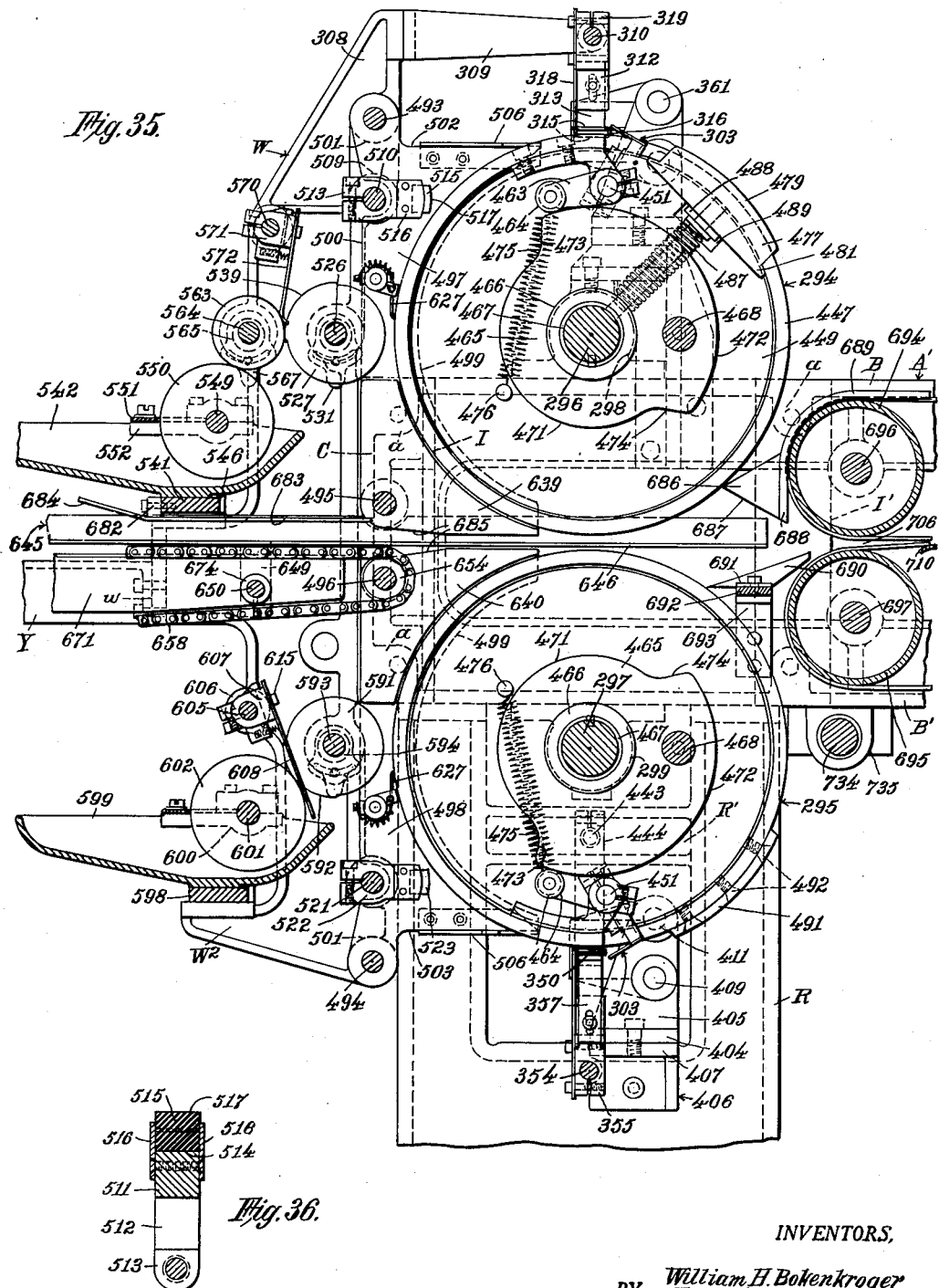

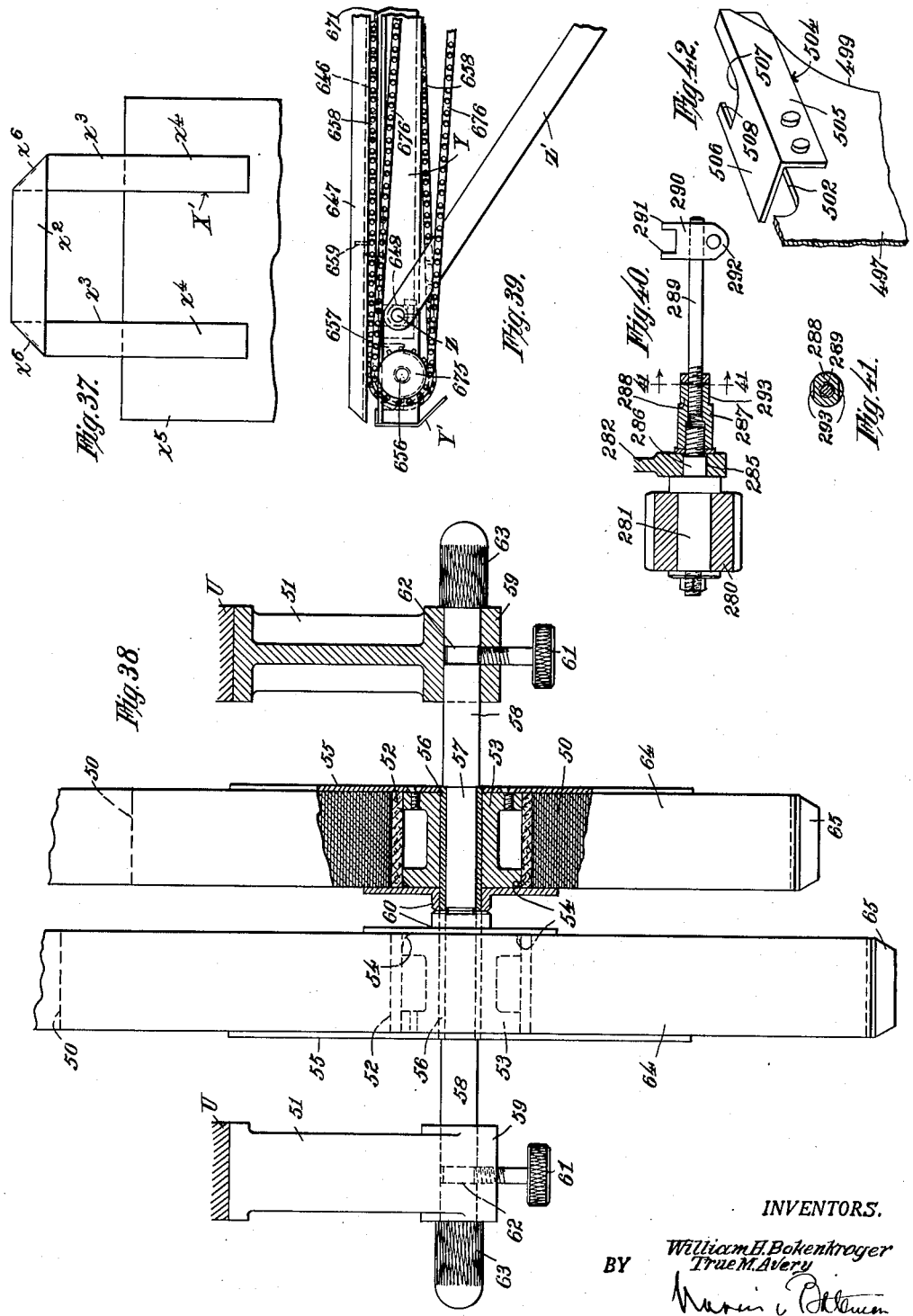

Jan. 20, 1953 W. H. BOKENKROGER ET AL 2,625,862
BAG HANDLE MAKING AND APPLYING MACHINE
Filed May 5, 1947 18 Sheets-Sheet 15
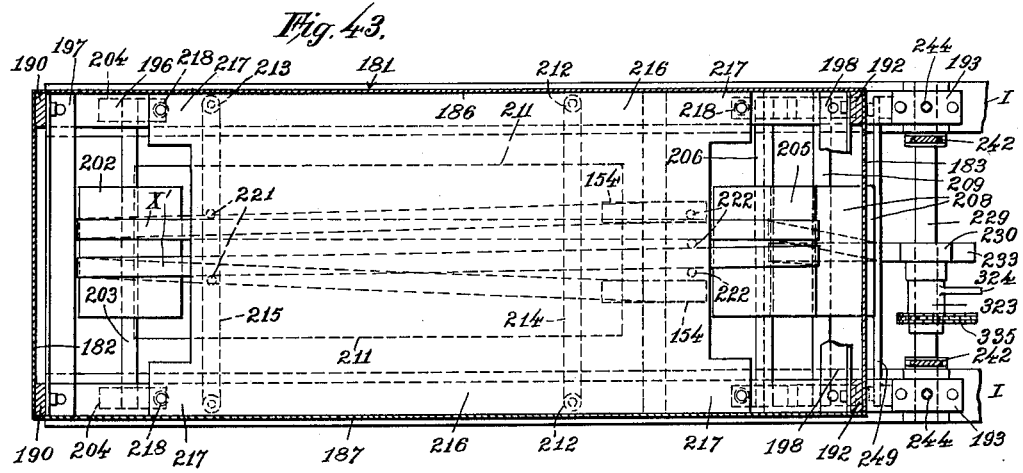
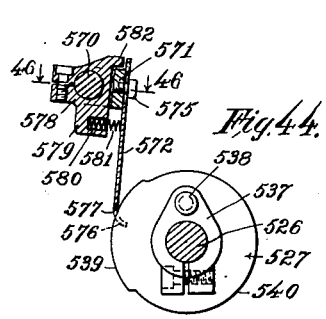
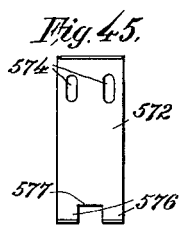
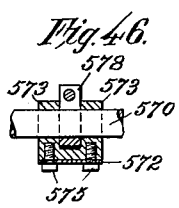
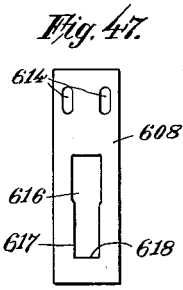
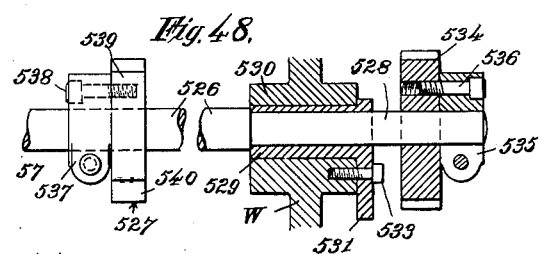
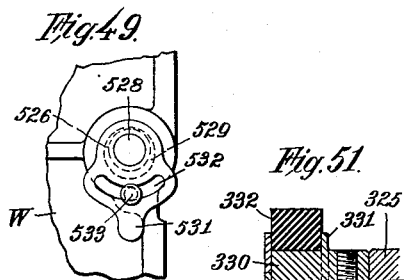
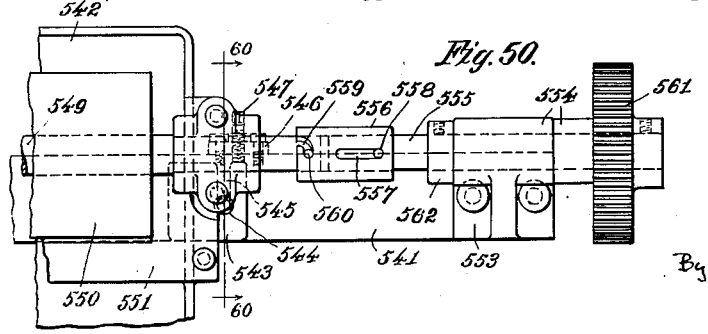
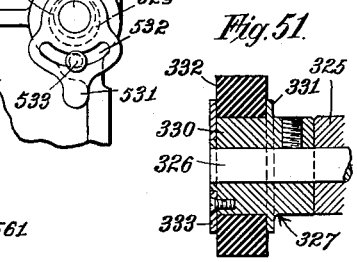
INVENTORS.
William H. Bokenkroger
True M. Avery
By
ATTORNEYS

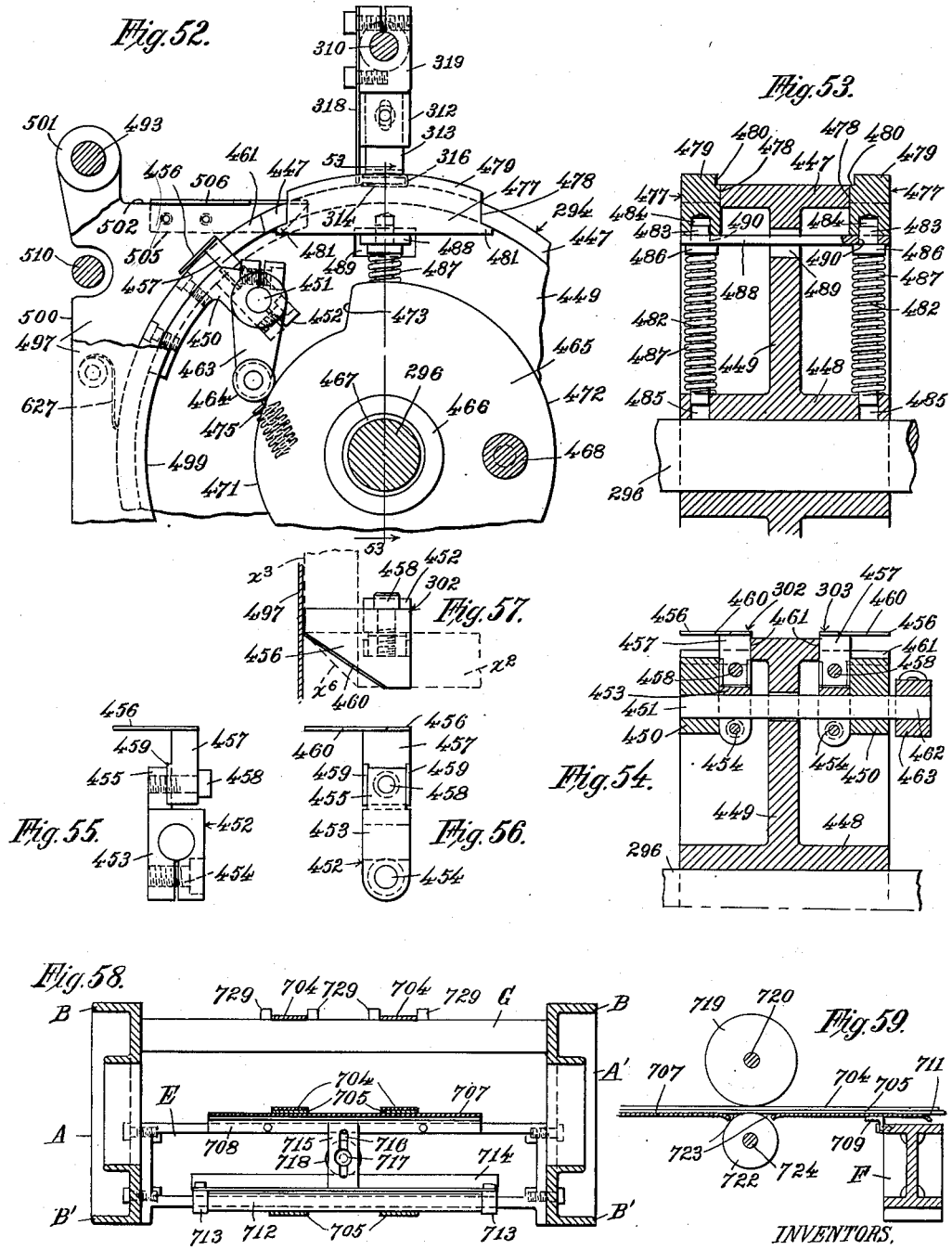

Jan. 20, 1953  W. H. BOKENKROGER ET AL  2,625,862
BAG HANDLE MAKING AND APPLYING MACHINE
Filed May 5, 1947  18 Sheets-Sheet 17
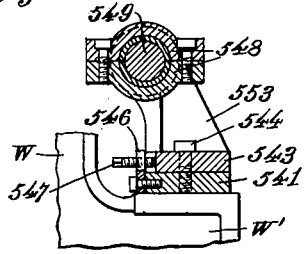
Fig. 60.
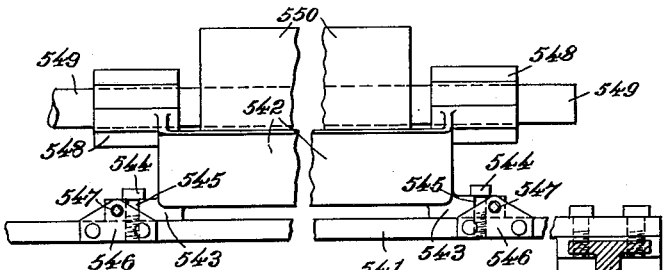
Fig. 61.
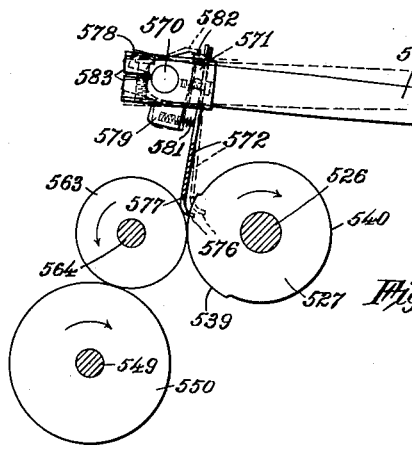
Fig. 62.
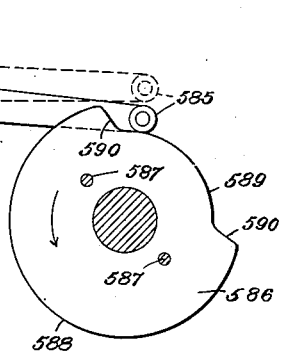
Fig. 66.
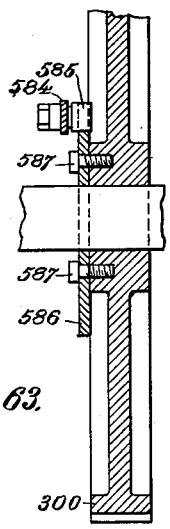
Fig. 63.
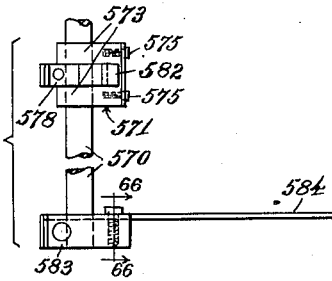
Fig. 64.
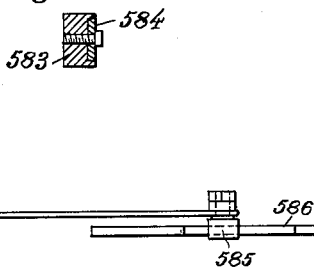
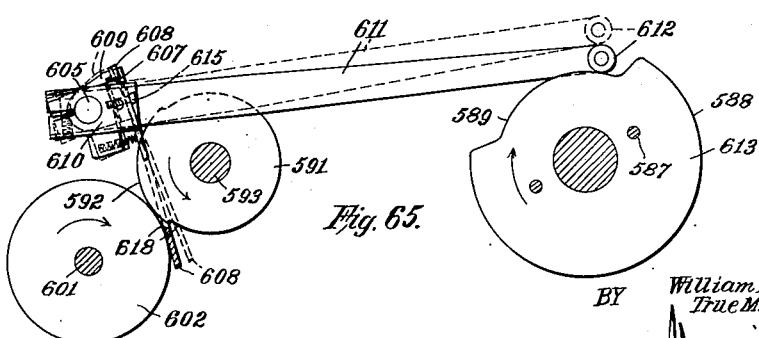
Fig. 65.
INVENTORS.
William H. Bokenkroger
True M. Avery
BY
ATTORNEYS

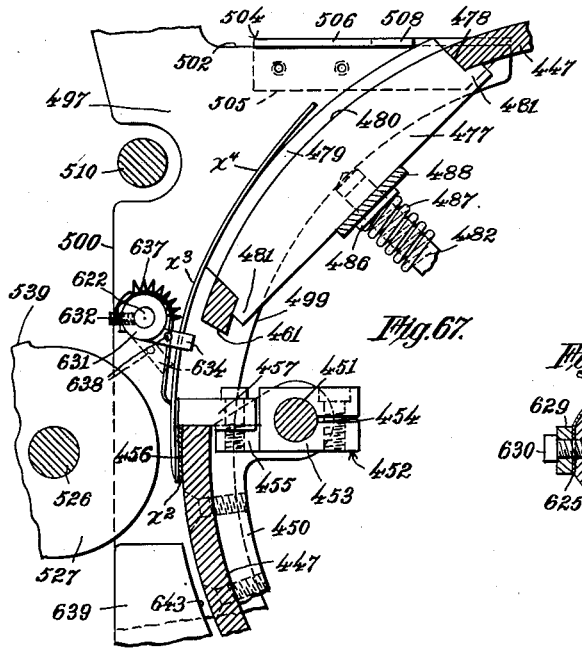
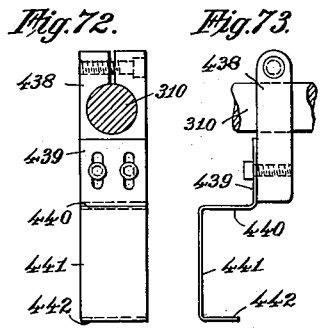
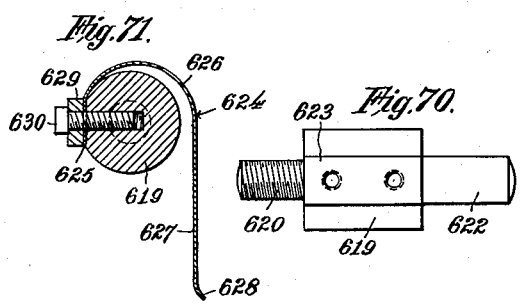
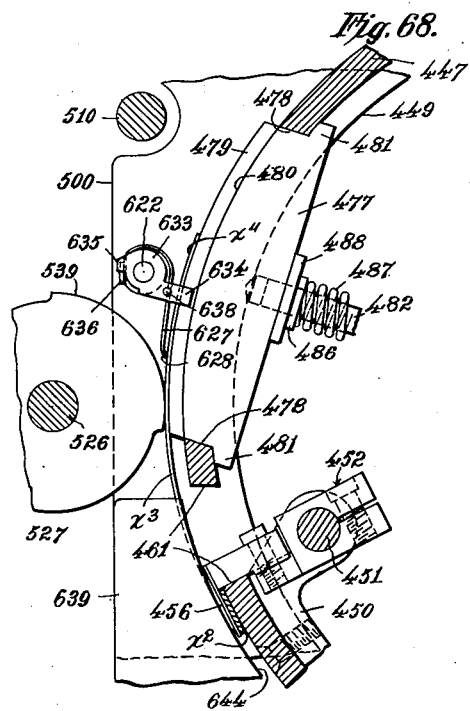
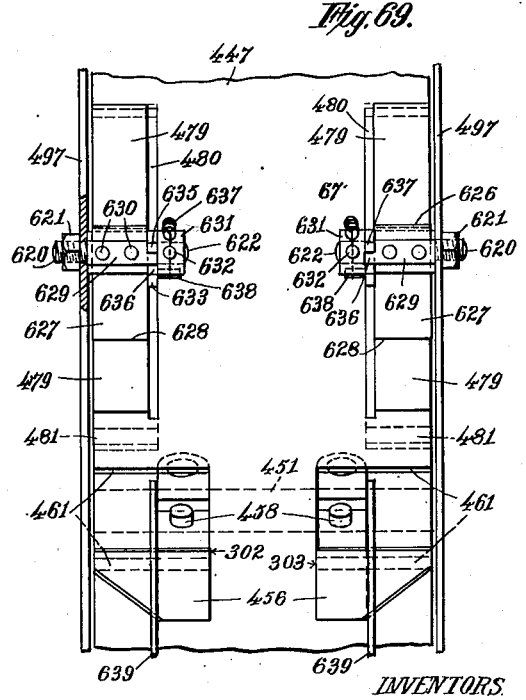

Patented Jan. 20, 1953

2,625,862

UNITED STATES PATENT OFFICE 2,625,862

BAG HANDLE MAKING AND APPLYING MACHINE

William H. Bokenkroger, Hudson Falls, and True M. Avery, Glens Falls, N. Y., assignors to Union Bag & Paper Corporation, Hudson Falls, N. Y., a corporation of New Jersey Application May 5, 1947, Serial No. 746,170

17 Claims. (Cl. 93—8)

This invention relates to a machine for making handles for shopping bags and for applying the same to the bags.

More specifically the invention relates to a machine adapted to make shopping bag handles such as disclosed in the application for patent of True M. Avery, Serial Number 696,727, filed September 13, 1946; and to apply said handles to preformed bags.

An object of the invention is to provide a machine for making handles of the type stated simultaneously in pairs, and for attaching said handles simultaneously to the opposite sides of preformed bags.

A further object of the invention is to provide a machine by means of which multi-ply handles may be formed from single-ply strips of material, and secured to the bags.

A further object of the invention is to provide a device as mentioned which may be readily adjusted to vary the length of the attaching portions of the handles.

Other objects will appear hereinafter.

The invention consists generally in a machine adapted to continuously crease, paste and fold a strip of paper, or other suitable material, longitudinally to form a multi-ply tape, sever said tape into sections of proper length, fold the severed sections to form handles comprising a grip portion and connecting end portions at substantially right angles thereto, and pasting parts of said end portions to preformed bags.

The invention further consists in a machine as above stated, adapted to form said handles simultaneously in pairs, and simultaneously attach said handles to the opposite sides of the bags.

The invention further consists in novel means for continuously pasting and folding a strip of material longitudinally to form a strip or tape of multi-ply thickness.

The invention further consists in a machine for continuously pasting and folding strips longitudinally to form multi-ply tapes, in combination with means for folding the pasted and longitudinally folded strips to form bag handles.

The invention further consists in a machine including a strip folding mechanism as above stated, in combination with novel means for maintaining sufficient tension on the strip to avoid slack, without tending to break or tear the strip when moistened by the paste applied thereto.

The invention further consists in a machine adapted for the purposes above stated, and in such combinations and arrangement of parts as are hereinafter described and particularly pointed out in the claims.

The invention will be more readily understood by reference to the accompanying drawings, forming a part of this specification, and in which Fig. 1 is a side elevation of a machine embodying the invention, a portion of the feed table for the bags being omitted.

Fig. 2 is a front elevation at the tape forming end of the machine, the closure for the heating chamber being removed.

Fig. 2a is a continuing front elevation of the machine at the handle forming and attaching end.

Fig. 3 is a detail view of the paper supply rolls and tensioning means.

Fig. 4 is a plan view of the portion of the machine illustrated in Fig. 2a.

Fig. 5 is a plan view of the bag feeding table, and including a portion of the discharge means, and the lower folding and pasting mechanism.

Fig. 6 is a transverse section on the line 6—6 of Fig. 5.

Fig. 7 is a detail sectional view of the upper portion of the feed chain supporting bar.

Fig. 8 is a detail section on the line 8—8 of Fig. 2, upon a much enlarged scale and illustrating the scoring rollers.

Fig. 9 is a detail side elevation of the upper end of one of the scoring roller brackets.

Fig. 10 is a detail sectional view of a pair of guide rollers forming a part of the scoring mechanism.

Fig. 11 is an enlarged detail section of adjacent portions of a pair of scoring rollers with a strip of paper illustrated between them.

Fig. 12 is an elevation upon an enlarged scale of the paste pot forming a part of the tape forming mechanism, and the supporting means for the same.

Fig. 13 is a plan view of the paste pot.

Fig. 14 is a section on the line 14—14 of Fig. 12.

Fig. 15 is a section on the line 15—15 of Fig. 12.

Fig. 16 is a horizontal plan view taken on substantially the line 16—16 of Fig. 2, and illustrated upon the same scale as Figs. 12 to 15 inclusive.

Fig. 17 is a detail section on the line 17—17 of Fig. 16.

Fig. 18 is a detail section on the line 18—18 of Fig. 16.

Fig. 19 is a similar section on the line 19—19 of Fig. 16.

Fig. 20 is an enlarged sectional view on substantially the line 20—20 of Fig. 2 illustrating the handle squeeze rollers and a portion of the heating chamber, the folding plates being omitted.

Fig. 21 is a section on the line 21—21 of Fig. 20.

Fig. 22 is a side elevation of one of the larger squeeze rollers.

Fig. 23 is a section on the line 23—23 of Fig. 22.

Fig. 24 is a section on substantially the line 24—24 of Fig. 2a illustrating the upper and lower draw rolls upon the same scale as Fig. 20, parts being shown in elevation and other parts in section.

Fig. 25 is a detail bottom plan view of the tape guide associated with the upper draw rolls.

Fig. 26 is a front elevation of the upper cut-off mechanism and supporting bracket.

Fig. 27 is a section on the line 27—27 of Fig. 26.

Fig. 28 is a detail plan view of the upper knife holder.

Fig. 29 is a front elevation of the lower cut-off mechanism and supporting bracket.

Fig. 30 is a section on the line 30—30 of Fig. 29.

Fig. 31 is a detail illustrating the cut-off knives in open position.

Figs. 32 and 33 are top and side views respectively of the cam lever for actuating the cutters.

Fig. 35 is a section on substantially the line 35—35 of Fig. 34, with the adjacent guide plates removed.

Fig. 36 is a detail section of one of the presser roll members for creasing the diagonal fold formed in shaping the handle.

Fig. 37 is a view of one of the handles such as made by the machine and a portion of the bag to which it is attached.

Fig. 38 is a detail plan view of the supply rolls and the supporting means for the same, parts being illustrated in section.

Fig. 39 is an elevation of the end portion of the feed table omitted from Fig. 1.

Fig. 40 is a detail view of an intermediate gear forming a part of the draw roll mechanism, and also illustrating the guide for the tape passing to the lower draw roller.

Fig. 41 is a section on the line 41—41 of Fig. 40.

Fig. 42 is a perspective view of one of the tape folding cams and a portion of a side plate to which the same is attached.

Fig. 43 is a schematic plan view taken on the line 43—43 of Figs. 2 and 2a, illustrating the paths of the tapes from the squeeze rollers to the draw rolls.

Fig. 44 is a detail view illustrating one of the upper paste discs and cooperating paste doctor.

Fig. 45 is a detail elevation of the paste doctor illustrated in Fig. 44.

Fig. 46 is a section on the line 46—46 of Fig. 44.

Fig. 47 is an elevation of a paste doctor used in conjunction with the lower paste discs.

Fig. 48 is a detail of the paste disc illustrated in Fig. 44 together with the eccentric mounting for the same at one end of the shaft.

Fig. 49 is an end view of the eccentric mounting.

Fig. 50 is a detail plan view of a portion of one of the handle paste dishes, and illustrating the separable connection between the paste roll shaft and the drive shaft for the same.

Fig. 51 is a detail section of one of the forwarding rolls.

Fig. 52 is a detail elevation of a portion of the upper folding cylinder, illustrating the gripper and the yielding presser member, together with the cooperating folding cams attached to a side plate, the upper portion of the near side plate being broken away.

Fig. 53 is a detail section of the upper cylinder taken on the line 53—53 of Fig. 52, and omitting the gripper actuating cam.

Fig. 54 is a similar radial section through the gripper mechanism.

Fig. 55 is a side elevation of one of the grippers, upon an enlarged scale.

Fig. 56 is a front view thereof.

Fig. 57 is a plan view of a gripper illustrating in dotted lines the tape folded over the same.

Fig. 58 is a section on the line 58—58 of Fig. 4.

Fig. 59 is a detail section on the line 59—59 of Fig. 4.

Fig. 60 is a section on the line 60—60 of Fig. 50.

Fig. 61 is a detail rear elevation of one of the paste dish mountings.

Fig. 62 is a diagrammatic view illustrating the operation of the upper paste roll doctors, the doctor being partly in section.

Fig. 63 is a detail section illustrating the paste roll doctor cam attached to the respective gear.

Fig. 64 is a plan view of the mechanism illustrated in Fig. 60.

Fig. 65 is a view similar to Fig. 62 but illustrating the lower paste rolls and doctors, the doctor being partly in section.

Fig. 66 is a detail section in the line 66—66 of Fig. 64.

Fig. 67 is a detail sectional view illustrating the operation of the drag spring and pivoted guide finger as the grippers pass one of the pasting rolls.

Fig. 68 is a similar view as the presser member passes the pasting rolls, the outer collar and finger actuating spring being omitted.

Fig. 69 is a detail elevation of the parts shown in Fig. 68, but omitting the tape and paste rolls.

Fig. 70 is a side elevation of a stud for supporting a drag spring and pivoted guide finger.

Fig. 71 is a transverse section of the same with the drag spring attached thereto.

Fig. 72 is a detail side elevation of one of the strippers associated with the tape severing knives, and Fig. 73 is an edge view of the same.

Figure 34:
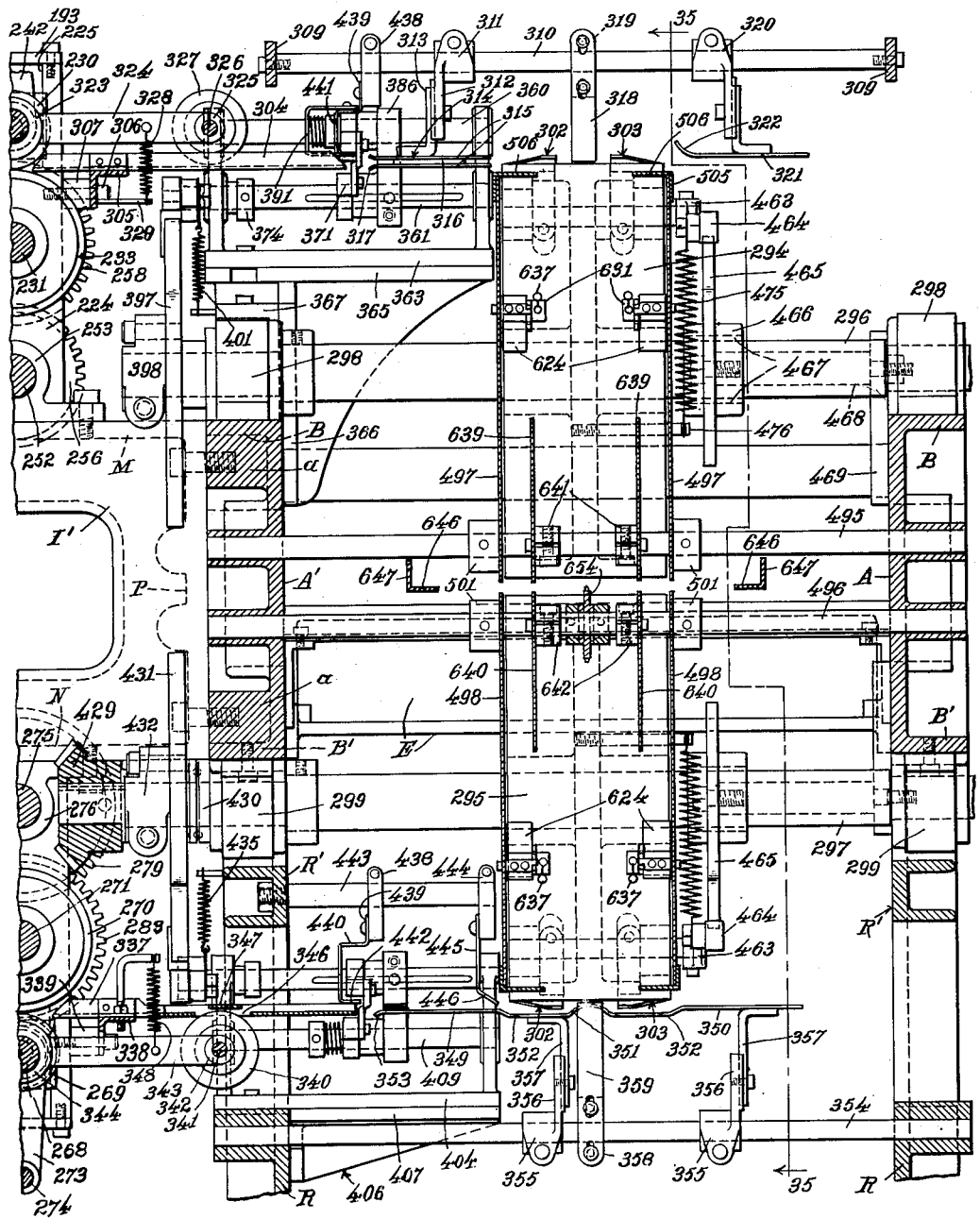
Fig. 34 is a front elevation of the handle folding cylinders and cooperating elements, some elements being omitted and others shown in section; and including a portion of the draw roll mechanism with sprocket gearing omitted.

In order that the invention may be more readily understood, a brief description of the machine as a whole will be given before describing the same in detail. In this brief description no attempt is made to describe particular features of the machine and their advantages, but merely to state the principal parts and their general operation.

The handles which are made by the machine are formed from continuous strips of materal, preferably a suitable paper, which are supplied in rolls; and as the handles are made simultaneously in pairs and affixed simultaneously to the opposite sides of the bags, separate rolls of material are provided from which the handles of each pair are made. To this end means are provided for supporting a pair of said rolls, preferably coaxially, and in a manner whereby either roll, when exhausted, may be readily replaced by a fresh roll.

From these rolls the strips of paper are drawn through a scoring device which scores each strip longitudinally along parallel lines, dividing the same into a central portion and a pair of lateral portions, the latter being preferably of slightly less width than the central portion. The scored strips then pass in contact with pasting means which applies paste to said lateral portions; and then through folders which fold the side portions inwardly bringing first one pasted side into contact with the central portion and then the other pasted side portion over the first.

From the folders the strips pass between squeeze rollers which firmly compress the pasted portions of the strip together, forming a three-ply tape. The parallel tapes thus formed may then be passed through a heated compartment, and past means for gradually converging the tapes toward superposed upper and lower draw roll mechanisms, one tape passing to the upper, and the other to the lower of said mechanisms.

Arranged in the path of the bags, which are fed through the machine, are a pair of handle folding cylinders, rotatable on horizontal axes and between which the bags pass. The draw rolls are arranged to pull the tapes through the succession of mechanisms above defined and feed them transversely across the periphery of the respective folding cylinders on the sides diametrically opposite to the pathway of the bags; that is, the upper draw rolls feed one of the tapes above the upper folding cylinder, and the lower draw rolls feed the other tape below the lower forming cylinder.

The folding cylinders are each provided with a pair of spaced grippers adapted to grasp the tape when fed into position to be acted upon. Suitable means are provided for guiding the tapes into proper position to be grasped by the grippers, and means are provided for severing the tapes when the proper lengths thereof have been supplied. As the sections of the tapes, each sufficient to form a handle, are severed, the grippers firmly clamp the central portion of the strip, which will constitute the grip portion of the handle, against the periphery of the cylinder and carry the strip past folding cams which fold the ends backwardly at right angles to the central portion held between the grippers.

Pressure rollers then engage the tape at the folds and permanently crease the same. Further rotation of the cylinders carries the folded ends between guiding means to paster rolls, which applies paste to the trailing portions of the rearwardly folded ends, and then applies the pasted portions to a bag as the bag passes between the cylinders. Presser means are provided on the cylinders for firmly pressing the pasted portions of the handles into contact with the bag. As the bag with the handles attached passes between the pressure elements of the cylinders, the grippers are retracted, and strippers detach the handles from the cylinders and guide them to a suitable discharge mechanism.

The machine as above broadly described is provided with a supporting frame and equipped with power mechanism for driving and actuating the several parts, all of which will now be described in detail.

For the sake of greater clearness, the frame portions of the machine will be designated by letters and the operative portions by numerals.

*The frame*

The frame of the machine comprises generally two main portions arranged at right angles to each other, and hereinafter designated as the "folding cylinder frame" and the "draw roll frame"; and a "paste dish supporting frame," the latter consisting in a pair of similar vertically disposed members secured to one end of the "folding cylinder frame" members respectively. Secured to the paste dish supporting frames and extending horizontally therefrom are the feed table frame members.

The folding cylinder frame comprises a pair of elongated horizontally disposed parallel members A—A$^1$, each having upper and lower flanges B and B$^1$ respectively, extending from end to end thereof, and vertical end flanges C and D. The members A—A$^1$ are spaced apart and rigidly connected at the lower portions by girts E and F, and by tie rods G and H adjacent to the upper portions and above the girts E and F respectively. The folding cylinders are located adjacent the forward end of the cylinder frame, and the portion of said frame from said cylinders to the rear end thereof is utilized for the discharge means for the completed bags.

The draw roll frame comprises a pair of parallel horizontally disposed side members I—I$^1$ similar to the members A—A$^1$, and connected intermediate their ends by a girt K, which is substantially the same depth as that of the side members. The members I—I$^1$ are each formed with upper and lower horizontal flanges M and N respectively, similar to the flanges B—B$^1$, and with end flanges O and P, the latter being secured by bolts to the frame member A$^1$ which is provided with bosses $a$ to receive them. With the exception of the bosses $a$ on frame member A$^1$, the members A, A$^1$, I and I$^1$ are similar and may be made from the same pattern.

The end of the cylinder frame upon which the cylinders are mounted and to which the draw roll frame is attached, is supported upon a pair of legs R—R which are secured to the lower flanges B$^1$, as by suitable bolts, and a girt S connects the lower portions of said legs. The opposite end of the cylinder frame is supported by a pair of legs T—T bolted to the lower flanges B$^1$. The outer end of the draw roll frame is supported by a pair of legs U—U similar to the legs T. Tie rods V—V connect the legs U adjacent the top and bottom thereof.

Fixed to the flange C of the cylinder frame members A—A$^1$ are vertically disposed elongated "paste dish supporting frame" members W—W, which support upper and lower paste dishes, paste rolls, presser rolls, handle guides and other details hereinafter described. These frames W are of irregular form and will be more fully described in relation to the elements supported thereby.

The frames W—W are each provided with integral extensions W$^1$ having vertical outer flanges $w$ to which the ends of horizontal feed rail supporting members Y—Y are secured. A tie rod Z connects said members Y—Y adjacent their outer ends, and diagonal brace bars Z$^1$ extending from said tie rod Z to the legs R support the outer ends of said members. The bars Z and associated parts hereinafter described constitute the feed table for feeding the preformed bags individually to the handle applying means, and is in alignment with the discharge means above mentioned so that the bags pass in a straight horizontal path through the machine, and between the folder cylinders. A sheet metal apron Y$^1$ is secured to the outer ends of the members Y as a guard for adjacent portions of the feed mechanism—as will hereinafter appear.

*Supply roll supports and tensioning means*

As hereinbefore stated, the material from which the handles are made is supplied to the machine from two separate rolls, as the handles are made in pairs simultaneously. Preferably the material used is a paper of the desired texture, but the invention is not to be considered as limited to the use of paper only, although the term "paper" will be used throughout in describing and claiming the invention.

Referring to Figs. 2, 3 and 38, of the drawings, 50, 50 indicate two rolls of paper which are supported coaxially on brackets 51 attached to the legs U of the draw roll frame. These rolls are supplied wound upon cores 52, usually of fiber, and of sufficient size to snugly fit core plugs 53, which are formed with a tapered end 54 to facilitate entry into the core. The plugs 53 are each provided with a side plate 55 secured thereto in any suitable manner, and with a bushing 56 which fits over the reduced end portions 57 of spindle shafts 58, which shafts are removably mounted in bearings 59 of the brackets 51. Flanged collars 60 fit over the ends of the bushings to hold the paper rolls against the plates 55. The inner ends of shafts 58 abut when in place, as do the collars 60; and knurled headed thumb screws 61 engaging annular grooves 62 in the shafts, maintain the parts in assembled position. Elongated knurled heads 63 on the shafts 58 facilitate manipulation of the same. When a roll becomes exhausted, it may be readily replaced without disturbing the other roll, by retracting the respective screw 61 and withdrawing the corresponding shaft 58, after which the core may be removed from the plug and another roll placed thereon.

To provide proper tension to the paper strips as they are drawn through the machine, flexible friction straps 64, such as leather, are secured to the upper tie rod V and extend over and in contact with a portion of the periphery of the rolls 50, 50 respectively; and the depending ends of said straps are provided with weights 65.

Throughout this description, and where illustrated in the drawings, the strips of paper before being folded longitudinally will be designated by the reference character X; and after being folded into a three-ply tape will be designated by the character X¹.

*The scoring mechanism*

The scoring mechanism through which the strips of paper X are first drawn is shown in Fig. 2, and illustrated on an enlarged scale in Figs. 8, 9, 10 and 11. As hereinbefore stated, each of the two strips of paper is to be folded longitudinally to form a three-ply tape with the plies pasted together; and to facilitate rapid and uniform folding of the strips, each strip is scored longitudinally in parallel lines along which the strip is to be folded. These lines of scoring are spaced to form a central portion, and two lateral portions of slightly less width than the central portion, as indicated by the dotted lines $x$, $x$ in Fig. 16.

The scoring is accomplished by pairs of cooperating discs between which the strips of paper X are drawn, one disc of each pair having an annular V-shaped rib on its periphery and the other disc having a corresponding groove. These discs are arranged in pairs, with two pairs provided for each strip of paper, as is obviously necessary, for forming the two lines of scoring on each strip.

Extending transversely of the draw frame, and secured to the under faces of the flanges N of the frame members I—I¹, and slightly forward of the legs U, is a scorer supporting bar 66. Supported on said bar and extending upwardly therefrom is a pair of brackets 67 in the lower portion of which is mounted the lower scorer shaft 68 held securely in position by screws 69. The upper portion of the brackets 67 are bifurcated forming vertical guideways 70 in which are mounted bearing blocks 71 for the upper scorer shaft 72. Caps 73 secured to the upper ends of the brackets 67 close the upper ends of the guideways 70.

Rotatably mounted on the lower shaft 68 are two pair of scoring discs 74 each having a peripheral V-shaped scoring rib 75; and mounted on the upper shaft 72 is a corresponding number of discs 76 having peripheral grooves 77 cooperating with the ribs 75. The discs 74 and 76 are provided with hubs 78 and 79 respectively, the adjacent ends of each pair of which abut and space the scoring ribs and grooves the required distance apart. Collars 80 abut the outer ends of the hubs and provide means for positioning the pairs of discs laterally on the shaft. The collars are secured in adjusted position by set screws 81.

The shaft 72 is provided with eccentric ends 82 of reduced diameter having bearings in the bearing blocks 71. These eccentric ends extend outwardly beyond the blocks and are provided with actuating levers 83 by means of which the shaft may be rotated to separate the grooved discs from the ribbed discs which is of particular advantage when threading the paper strips through the machine. A pin 84 extends outwardly from each bracket 67 into the path of rotation of the lever to constitute a step for the same in the direction of rotation of the discs. The levers 83 are formed with clamps 85 by means of which they are angularly adjustable on the shaft.

A spring 86 arranged under each block 71 and held in place by a stud 87 projecting upwardly from the bottom of the guideway, tends to force the blocks upwardly; and screws 88 threaded through the caps 73 impinge against the upper faces of the blocks and limit the upward movement. This provides means for nicely adjusting the relative positions of the discs to assure the desired degree of scoring. After the blocks are properly set or adjusted, the levers 83 are positioned in engagement with the pins 84 and clamped to the shaft.

In order that the scorings on the strips shall be properly spaced laterally thereon, the scoring mechanism is provided with guide rolls 89 mounted on a shaft 90 behind and parallel to the shaft 68, said shaft 90 having bearings in arms 91 on the brackets 67. The guide rollers 89 are provided with flanges 92, which engage the edges of the paper strips as they approach the scoring discs, and are equipped with set screws 93 whereby they may be adjustably secured on the shaft with relation to said discs to guide the strips accurately to the scorers.

The paper strips, on being drawn from the supply rolls, pass upwardly and rearwardly to the rolls 89, partly around the same between the guide flanges 92, and then forwardly between the scoring discs. From the scoring discs the strips are passed to a pasting mechanism which will be designated as a seam pasting means to distinguish the same from the handle pasting mechanism hereinafter described.

*The seam pasting mechanism*

Secured to the flanges O of the draw frame members I—I¹, are brackets 94 and 95, having bearings 96, 96 for a shaft 97, on which is mounted a paste dish support 98. See Figs. 2 and 12 to 15 inclusive. The support 98 comprises a shallow rectangular member having a flat bottom 99 provided with an upwardly extending peripheral flange 100. A transversely disposed rib 101 is formed on the bottom 99 and fits into a groove 102 extending longitudinally of the shaft 97 and tapered in cross section to fit said rib. Inwardly of said rib 101 the support 98 is provided with a depending weight portion 103, preferably integral therewith. The dish support 98 is clamped to the shaft 97 by a clamp bar 104 having a curved end 105 engaging under the shaft 97. The opposite end of the bar 104 is provided with a pair of upwardly extending lugs 106 between which a downwardly tapered lug 107 on the bottom 99 engages. A clamping screw 108 extends through the bar 104 and is threaded into a boss 109 on the bottom of the dish support 98. The lower end of the screw 108 is provided with a hand wheel 110 having a hub 111 which impinges against the bar 104 to clamp the same against the shaft 97.

A paste dish 112 is supported by the holder 98 and is provided on its bottom with a rectangular rib 113 which fits within said holder, the adjacent faces of the flange 100 and the rib 113 being inwardly inclined to provide a snug fit.

Extending transversely of the paste dish 112 is a shaft 114 resting in U-shaped bearings 115 formed integrally on the upper side edges of the dish. Collars 116 secured to the outer ends of the shaft prevent longitudinal movement thereof. Mounted on the shaft 114 are four paste discs 117 having hubs 118. The discs 117 are arranged in pairs as illustrated in Figs. 12 and 13, there being a pair for each of the two strips of paper hereinbefore mentioned, and are spaced apart the proper distance to apply the paste to the outer portions of the scored strips as illustrated in Fig. 16 wherein $x^1$ indicates the lines of paste as applied to the strips X. A spacing collar 119 is located between the inner ends of the adjacent hubs of the respective pairs, and collars 120 on the shaft 114 and abutting the outer ends of the outer hubs prevent lateral movement of the discs 117.

The rear edge of the paste dish 112 is provided with an inwardly extending flange 121, which is elevated slightly above the plane of the upper edges of the dish, and adjustably mounted on said flange 121 are a plurality of paste doctors 122, one for each disc 117. The doctors 122 are bifurcated as shown in Fig. 12, providing notches 123 to receive the edge portions of the paste discs, and keep a surplus of paste from accumulating on the sides of the discs. The doctors 122 are provided with longitudinally disposed slots 124, through which the attaching screws 125 extend, and which provide means whereby the doctors may be adjusted toward and from the discs so as to regulate the quantity of paste permitted to adhere to the peripheral edges of the discs for application to the paper strips X.

The shaft 97 is mounted to permit oscillation in the bearings 96 so that the paste dish may be tilted forwardly or backwardly; and a spring 126 having one end secured to a hook member 127 engaging over the inner edge of the paste dish, and the other end attached to the upper tie rod V on the legs U, tends to normally tilt the dish backwardly to bring the discs 117 toward an idler roller 128 about which the strips X pass, as shown in Fig. 2.

A weight 129 provided with a hub 130 is adjustably secured to the shaft 97. This weight also tends to tilt the paste dish backwardly, and provides sufficient inertia to prevent undue vibration or movement of the dish; and being adjustably mounted on the shaft, may be arranged to provide the desired amount of inertia.

When it is desired to thread the strips X between the discs 117 and the roller 128, the dish 112 is tilted forwardly to provide a gap between the roller and discs. To this end means are provided for moving the dish against the tension of the spring 126 and the weights 129 and 103. Mounted in bearing 131 on the bracket 95 is a throw-out stud shaft 132 provided with an actuating crank 133. Fixed to the shaft 97 is a paste dish lever 134 bifurcated at its lower end to fit over the shaft 132. The recess 135 for the shaft, formed by the bifurcation, is of substantially the same width as the diameter of the shaft 132, and the shaft is cut away upon one side forming a flat faced recess or notch 136. When the parts are in normal operative position, as shown in the drawings, the flat face of the recess is engaged by one arm 137 of the bifurcated end of the lever 134 and the dish is tilted backwardly. By turning the shaft 132 by means of the crank 133, the shaft cams the lever over so as to tilt the dish and move the discs 117 out of engagement with the roller 128. The paste dish lever is secured to the shaft 97 by means of a clamp 138 formed integrally therewith.

In order that the strips X after leaving the scorer shall be in position about the idle roller 128 to receive the paste in the proper line, a suitable guide is interposed between the scorer and said roller. This comprises a shaft or rod 139 parallel with the axis of the roller and provided with collars 140 adjustably mounted thereon and between which the strips X pass just before reaching the roller. See Figs. 2 and 16. This rod or shaft is illustrated as supported by links 141 held in adjusted position on the frame members, as by bolts 142; but this arrangement is not necessary as the rod may be supported in any desired manner without departing from the scope of the invention. After the strips X have been scored and paste applied to the outer longitudinal sections, they pass to the strip folding means where the comparatively broad strips are formed into narrower three-ply tapes $X^1$.

*The strip folding means*

The strip folding means is shown in Fig. 2 and illustrated in detail in Figs. 16 to 19 inclusive. This comprises two similar devices, one for each strip X, and each consisting of an upper and lower guide plate for folding the outer portions of the strips at the lines of scoring over the central portion of the strip, successively. That is, either the right or left edge portion with the paste thereon is folded over the central portion, and then the opposite edge, with the paste thereon, is folded over the first. Preferably, the two folders are arranged to fold the sides of the respective strips inwardly in opposite sequence. Otherwise, the two folding devices are alike and the description of one will suffice for both.

Each folding device comprises an elongated flat bottom guide plate 143 having an upturned longitudinal flange 144, and an upper guide plate 145 having an upturned flange 146. The bottom plate 143 is preferably fixedly secured at its ends as by screws 147 to transverse supporting members 148 and 149 respectively, which will be more fully described hereinafter. The upper plate 145 is provided with transverse slots 150 to receive screws 151, by which it is adjustably secured in position relative to the plate 143.

The strips X are fed between the flanges 144 and 146 with the central portion thereof resting on the bottom plate and with the lines of scoring arranged at the apexes of the angles respectively between the plates and the flanges, as shown in Fig. 17. The flange 144 is bent inwardly to an increasing degree progressively from the entrance end, to fold one edge of the strip X inwardly and downwardly until the respective side portion of the strip is contacted with the central portion thereof, as shown in Fig. 18, which is approximately midway of the length of the folder.

The flange 146 is gradually bent inwardly and downwardly, but less abruptly than the flange 144, and folds the opposite edge of the strip down over the first folded edge portion until the pasted face thereof engages the outer face of the first said portion. In order to permit contact of the last folded portion with the previously folded portion, the flange 144 is tapered in width toward the discharge end, as shown at 152.

The entrance ends of the folders are supported upon the transverse support 148, which comprises a horizontally disposed bar having its ends bent downwardly and then outwardly as at 153 to rest upon the upper flanges M of the side frames I—I¹ to which they are bolted. The support 149 for the discharge end of the folders comprises an angle iron bolted to the brackets in which are mounted the squeeze rollers to which the folded strips or tapes $X^1$ next pass.

The squeeze rollers

This mechanism is shown in Fig. 2 of the drawings and illustrated in detail in Figs. 20 to 23 inclusive.

In order that the several plies of the freshly pasted and folded tapes $X^1$ shall be firmly pressed into contact before the paste begins to set, squeeze rollers are provided between which the tape is passed as it leaves the folders. These rollers are arranged in pairs, one pair for each of the two tapes, and each pair comprising an upper roller 154 and a lower roller 155. The upper rollers 154 and the lower rollers 155 are mounted upon parallel transverse shafts 156 and 157 respectively.

The upper rollers each comprises a collar 158 having an annular band 159 mounted upon its periphery and preferably formed of steel. The band 159 is held in position between an annular flange 160 formed integrally on one side of the collar and detachable securing means on the opposite side thereof, which may be of any desired construction, but is preferably a plurality of washers 161 held in place by screws or bolts 162. An integral hub 163 on the collar 158 provides means whereby the roller may be secured to the shaft by a set screw 164.

The lower rollers 155 are of substantially the same width as the annular bands 159 of the upper rolls, but are preferably of considerably less diameter; and the peripheries of said rollers are formed with a central peripheral depression 165 between the lateral portions 166, by which construction the edges of the tape will be tightly squeezed making permanently creased, folded and pasted edges, and at the same time less pressure will be applied at the center portion to avoid extruding more paste than necessary. A tape of uniform width and thickness is thus formed.

The rollers 155 are rotatably mounted on the shaft 157 and are formed with integral hubs 167 and bushings 168. Collars 169 at each end of the hub are provided for maintaining the rollers in adjusted position on the shaft.

Secured to the flanges M of the side frames I—I¹, and extending upwardly therefrom, are brackets 170 in which the shafts 156 and 157 are mounted; 171 indicating the bearings for the former. The lower shaft 157 is mounted eccentrically in sleeves 172, having bearings 173 in the brackets 170. Formed integrally with the eccentric sleeves 172 are levers 174 by means of which the sleeves may be rotated to move the rollers 155 toward or from the upper rollers 154 to facilitate inserting the paper between the rollers, and also for adjustment of the pressure on the tape. The levers 174 are each provided with an accurate slot 175 to receive screws 176 threaded into the bracket for securing the eccentric sleeves in adjusted position.

A vertical face 177 is formed on each of the brackets 170 on the side adjacent the folding device, and to which the support 149 is secured. A sprocket 178 is provided on the shaft 156 for imparting rotation thereto, and intermeshing spur gears 179 and 180 on shafts 156 and 157 ensure uniform peripheral speeds for the rollers.

The tape heating means

Supported above the several mechanisms hereinbefore described is a heated chamber 181 to and through which the tapes $X^1$ may be passed after leaving the squeeze rolls. This chamber is illustrated in Figs. 2, 2a, 20 and 43, and comprises generally a boxlike structure, preferably of sheet metal, and provided with heating means, and with idle rollers and guide means for the tapes as they pass therethrough.

This heated chamber may be used to set the paste between the plies of the tapes sufficiently to hold the plies together during the travel of the tapes.

The chamber 181 includes end walls 182 and 183 respectively, a top wall 184, a bottom 185 and a preferably fixed back wall 186. The front side of the chamber comprises a hinged closure 187 provided with a handle 188 to facilitate opening and closing the same. The supporting frame for said chamber consists in a pair of bars 189 comprising upright portions 190 having their lower ends secured to the flanges O of the frame members I—I¹ respectively, horizontal portions 191 extending the entire length of the chamber, and vertical portions 192. Horizontal bar members 193 are provided to support the bottom 185. The bars 193 are supported at one end upon angle bars 194 secured to the inner faces of uprights 190 as shown in Fig. 2, and the other ends thereof are supported on the draw roll brackets as described hereinafter. Intermediate their ends the bars 193 rest upon and are secured to the flanged upper ends 195 of the squeeze roll brackets 170. Extending longitudinally of the chamber 181 and spaced below the top thereof are bars 196 supported at their ends by angle bars 197 and 198 fixed to the upright portions 190 and 192 respectively.

Mounted on the frame bars 193 at the ends thereof above the roller 128 are bearing blocks 199 for the shaft 200 of an idle roller 201. Directly above the roller 201 is a second idle roller 202 having a shaft 203 supported in bearings 204 on the bars 196. At the opposite end of the chamber is a third idle roller 205 having a shaft 206 supported in bearings 207 also on bars 196. Below the roller 205 and somewhat in advance thereof is a fourth idle roller 208, the shaft 209 of which is mounted in bearing blocks 210 depending from the bars 193. The bottom 185 of the chamber extends from adjacent the roller 201 to adjacent the roller 208, and from front to back of the chamber.

Extending from adjacent the upper portion of the upper squeeze rollers 154, and curving upwardly to adjacent the idle roller 201, is a lower guide shield plate 211, the curvature of which is substantially tangential to the peripheries of said rollers. The plate 211 is supported by a pair of hangers 212 adjacent the roller 154 and a pair of hangers 213 adjacent the roller 201. The lower ends of said hangers are connected by transverse bars 214, 215 respectively to which the shield plate 211 is attached.

An upper shield plate 216 is arranged in the upper portion of the chamber 181 and is preferably co-extensive in width therewith. The plate 216 extends from adjacent the roller 202 to adjacent the roller 205, and the curvature of the downwardly bowed underface thereof is preferably substantially tangential to the peripheries of said rollers. The ends of the plate 216 are provided with extensions 217 projecting on each side of said rollers and which are secured to supporting blocks 218, resting upon the frame bars 196.

The two tapes $X^1$ after passing between the squeeze rollers 154, 155 move upward and over the upper roller 154 and along and in contact with the underface of the lower shield plate 211, to the idle roller 201. They then pass upwardly and over roller 202, along the underface of the upper shield plate 216 to roller 205, and then downwardly to the inward portion of the roller 208. One of the tapes $X^1$ passes under the last said roller, and thence horizontally to an upper draw roll mechanism 219; and the other tape $X^1$ passes downwardly to a lower draw roll mechanism 220.

The upper and lower draw roll mechanism, which will be hereinafter described, and arranged one directly above the other, and therefore means are provided for guiding said tapes in laterally converging paths to said mechanisms respectively. The paths of the tapes from the squeeze rolls to the draw rolls is illustrated in Fig. 43. In order to gradually converge the paths of the tapes guide studs 221 are provided under the lower shield plate 211 for guiding the tapes as they approach the roller 201, and similar studs 222 are provided under the shield plate 216 adjacent the roller 205. These studs are positioned to engage the edges of the tapes and gradually converge them laterally as illustrated.

The tension imparted to the tapes by the draw rolls is sufficient to draw them tautly over the bowed faces of the shield plates 211 and 216, thereby preventing the outer plys of the tapes from wrinkling and unfolding. Also the tape passing from the roller 208 to the lower draw rolls is turned or twisted a half turn as illustrated in Fig. 2a, so as to present the unseamed side of the tape to the periphery of the folding cylinders and to the pasting mechanism, as will be apparent hereinafter.

To facilitate heating of the tapes, any suitable heating means may be provided, such as an electric heating element 223, indicated in Fig. 2. However, it is to be understood that the heating means may be of any desired form or arrangement.

The draw roll mechanisms

The draw roll mechanisms are shown in Figs. 2a, 4 and 34, and illustrated in detail and upon an enlarged scale in Fig. 24. These rolls are designed to draw the two tapes through the chamber 181 and to feed the same to a pair of handle folding cylinders which are arranged on parallel axes, preferably one above the other, and between which preformed bags are fed in a path transverse to the path upon which the tapes are fed, all as will appear hereinafter.

The tapes are fed transversely across the peripheries of said folding cylinders respectively, preferably at the portions of said peripheries diametrically opposite from the path of the bags. That is, in the form illustrated, one tape is fed across the uppermost part of the upper cylinder and the other tape beneath the lowermost part of the lower cylinder. The paths of the tapes from the draw rolls to the cylinder are therefor directly one above the other instead of laterally spaced as in the forming mechanisms; and it is for this reason that the tapes are guided in converging paths as above described.

The upper and lower draw roll mechanisms are generally of similar construction, and each comprises a pair of draw roll shafts, draw rolls thereon, a power transmitting shaft and a pair of brackets having bearings for said shafts. However, as there are essential differences in the details of said upper and lower draw roll mechanisms, they will be separately described.

The upper draw roll mechanism

Fixed to, and extending upwardly from the flanges M of the frame members I—I¹, are a pair of brackets 224, 224, the upper ends of which are bifurcated forming ways 225 for vertically slidable bearing blocks 226. The upper ends of the ways are closed by the ends of the frame members 193, which form caps for the same, as shown in Fig. 2a. Mounted in the bearing blocks 226 are eccentric bearings 227 for the reduced ends 228 of a shaft 229 upon which the outer draw roll 230 is mounted.

Below, and parallel with the shaft 229, is a shaft 231 having bearings 232 in the brackets 224, and upon which is mounted the inner draw roll 233. The terms "inner" and "outer" will be used for the draw rolls of both the upper and lower draw roll mechanisms, to designate their positions relative to the center of the machine; that is, the plane of the path of the bags through the machine.

The inner draw roll comprises an annular band 234 mounted upon a collar 235 having an integral flange 236, and secured in position against said flange by clamping means 237. The outer and inner rollers are keyed to their respective shafts as indicated at 238 and 239 respectively, and are held in laterally adjusted positions by set screws 240 and 241.

To facilitate threading the tape between the rolls, the eccentric bearings 227 are rotated to shift the outer shaft 229 and roller 231 outwardly, and to this end said bearings are formed with integral lever arms 242 connected at their outer ends by a stay rod 243 which serves as a handle to manipulate the same.

In order to regulate the pressure on the tape $X^1$ between the rollers 230 and 233, each of the bearing blocks 218 are held in position between adjusting screws 244 and 245. The screws 244 are threaded through the bracket caps and impinge against discs 246 resting upon resilient cushions 247 seated in the outer faces of said blocks. The screws 245, which impinge against the lower faces of the bearing blocks, are threaded into the brackets at the base of the bifurcations, and are provided with lock nuts 248.

To accurately guide the tape to the draw rolls, a guide bar 249 is provided. The bar 249 is secured to the approach faces of the brackets 219 and is provided in its lower edge with a notch 250 through which the tape from the roller 208 passes. The notch 250 is substantially the width of the tape and the end walls thereof are rounded as indicated at 251 to guide the tape with minimum friction and wear.

Below, and parallel with the shaft 231, is a power transmission shaft 252 having bearings 253 in the brackets 224, and provided with a sprocket 254 driven by a sprocket chain 255. The shaft 252 extends beyond one of the brackets 224, and mounted on said extended end is a pinion 256 meshing with a pinion 257 on an extended end of the inner draw roll shaft 231. The shaft 231 also carries a pinion 258 meshing with a pinion 259 on the extended end of shaft 229. The ratio of the gears 258 and 259 is such as to provide uniform peripheral speeds for the rolls 230 and 233. The shaft 252 also carries a sprocket 260 connected by a chain 261 with sprocket 173 on the squeeze roller shaft 156.

*The lower draw roll mechanism*

Extending downwardly from flanges N of the frame members I—I¹ are brackets 262—262, similar to brackets 224 but in inverted position. These brackets are bifurcated at the outer or lower ends forming ways 263 for bearing blocks 264 identical with the similar parts in the upper draw roll mechanism. The ends of the ways are closed by cap plates 265. Eccentric bearings 266 are mounted in the blocks 264 for the reduced ends 267 of shaft 268, upon which the outer draw roll 269 is mounted. An inner draw roll 270 is mounted on a shaft 271 having bearings 272 in the brackets, and is identical in construction with the roll 233.

The eccentric bearings 266 are provided with lever arms 273 connected at their outer ends by a stay rod 274, which serves as an operating handle in the same manner and for the same purpose as the stay rod 245 above described.

A power transmission shaft 275, having bearings 276 in the brackets 262, is provided with a miter gear 277 through which power is derived from a source hereinafter described. A thrust bearing 278 is provided between the gear 277 and the adjacent bracket 262. One end of the shaft 275 is extended beyond the bearings and provided with a pinion 279, which meshes with an intermediate gear 280 loosely mounted on a stud shaft 281, which is adjustably mounted upon a bracket 282 fixed to and depending from the flange N. See Fig. 40. The shaft 271 is provided with a pinion 283 meshing with intermediate gear 280 and with a pinion 284 on shaft 268. The ratio of the pinions 283 and 284 is such as to impart uniform peripheral speeds to the rolls 269 and 270.

The bracket 282 is formed with an arcuate slot 285 in which the shank 286 of stud shaft 281 is adjustably mounted, and the arc of said slot is concentric with the shaft 271 so that the gear 280 and pinion 283 will remain in mesh when the former is in any adjusted position. By this arrangement, the pinion 279 may be replaced by pinions of various sizes when it is desired to change or adjust the speed of this portion of the machine.

The stud shaft 281 is held in position on the bracket 282 by a collar 287 threaded on the shank 286. See Figs. 40 and 41. The collar 287 is elongated, and into the extended end 288 thereof is threaded a rod 289 upon which is mounted a block 290 having lateral extensions or lugs 291 constituting guides for the tape passing to the rolls 269—270. The guide block 290 is formed with a clamp 292 whereby it may be adjusted both longitudinally of the rod and angularly thereon, so that it may be positioned to properly guide the tape when the stud shaft 281 is adjusted on the bracket 282. Flat faces 293 on the collar 287 provide a suitable wrench hold.

*The handle forming mechanisms*

As above stated, a function of the draw roll mechanisms is to feed the tapes $X^1$ to upper and lower handle forming cylinders, indicated by the reference characters 294 and 295 respectively, which cooperate with other elements hereinafter described to form severed sections of the tapes into handles such as illustrated in Fig. 37 of the drawings. In said figure a section of the tape $X^1$ is shown as folded to form a grip portion $x2$ and end portions $x3$ at right angles thereto, the latter being of sufficient length to include ample terminal portions $x4$ for attaching the handles to a bag $x5$.

The cylinders 294 and 295 are each of substantially the width of the handles to be formed and are mounted on and keyed to shafts 296 and 297 respectively, which are journaled in bearings 298 and 299 secured to the outer faces of flanges B and $B^1$ of the frame members A, $A^1$. The outer ends of the shafts extend beyond the respective bearings and are provided with intermeshing gears 300—301 whereby the cylinders are rotated in opposite directions and at the same peripheral speed.

Each cylinder is provided with a pair of laterally spaced grippers 302—303 for firmly clasping a section of tape to the periphery of the cylinder and carrying the same successively into operative relation with folding cams, fold creasers, and paste applying means, all as will be described hereinafter.

As the tapes are fed from the draw roll mechanisms transversely across the rotating cylinders, means are provided to guide the tape and hold it in position until clamped by the grippers; and means are also provided for severing a section of the tape after being fed into position.

*Upper tape guiding means*

Extending from adjacent the draw rolls 230—233 and in a path traversing the periphery of the cylinder 294 is a trough-like channel member 304 into which the tape $X^1$ passes from between said rolls. The channel member 304 is supported upon an angle bar 305 fixed to the adjacent edges of the draw roll brackets 224 as by screws 306, and spaced from said brackets by spacing blocks 307. From the upwardly extending ends 308 of the paste dish frames W—W are brackets 309, the outer ends of which are connected by a handle guide shaft 310 parallel with and directly above the axes of the folding cylinders. Adjustably mounted on said shaft 310 is a clamp 311 having a depending arm 312 to which is adjustably attached the supporting bracket 313 of a guide channel 314; the latter comprising parallel upper and lower strips 315 connected intermediate their ends by a V-shaped portion 316. The adjacent ends of the guide members 304 and 314 are spaced apart to accommodate tape severing knives of the cut-off mechanism; and the ends of the strips 315 adjacent the member 304 and said knives are flared as at 317 to ensure the entry of the advancing end of the tape after a section has been severed.

Depending from the shaft 310 is a tape drag spring 318, the lower end of which terminates in close proximity to the peripheral surface of the cylinder and substantially centrally of the width thereof. This drag spring is adjustably mounted on a clamp 319, which is adjustably mounted on the shaft 310; and is adapted to engage an edge of the tape $X^1$ and prevent the tape from being diverted from its path across the rotating cylinder due to frictional contact therewith.

A clamp 320 on the shaft 310 adjustably supports a horizontally disposed guide strip 321 at the opposite side of the cylinder from the guide 314. The guide strip 321 lies in a plane slightly above the adjacent portion of the periphery of the cylinder, and the end 322 thereof adjacent the cylinder is upwardly curved in order to deflect the free forward end of the advancing strip downwardly. The guides 314 and 321 will therefor hold the strip in contact with the periphery of the cylinder and in position to be grasped by the grippers 302 and 303; and the drag spring 318 will prevent the tape from being displaced laterally due to frictional contact with the cylinder until the tape is carried under the same by the grippers.

Mounted on the shaft 229 of the draw roll mechanism is a sleeve 323, having an arm 324 extending parallel with the channel tape guide 304 and terminating in a sleeve 325, in which is rotatably mounted a shaft 326. Fixed to the shaft 326 is a forwarding roll 327, which rests upon the tape in the guide 304. A spring 328, having one end attached to the arm 324 and the other end to a pin 329 projecting from the angle bar 305, maintains the roll 327 in frictional contact with the tape.

The forwarding roll 327 (see Fig. 51), comprises a hub 330, having an annular flange 331, a friction ring 332 preferably formed of rubber, and an end plate 333 securing the ring in position on the hub.

A sprocket 334 fixed to the shaft 229 is connected by sprocket chain 335 to a sprocket 336 on the forwarding roll shaft 326, thereby driving said roll 327 at the same peripheral speed as that of the draw rolls.

After the desired length of tape has been moved into position to be operated upon by the folding mechanism, the section is severed from the tape by the knives hereinbefore mentioned.

*The lower tape guiding-means*

The means for guiding the tape $X^1$ from the lower draw rolls 269—270 are similar to the above, but with some variations. A trough-like channel member 337 extends from adjacent the draw rolls to adjacent the knives of the lower cut-off mechanism. This channel member is supported upon an angle bar 338 secured to the draw roll brackets 262 and spaced therefrom by spacing blocks 339. A forwarding roll 340 like the roll 327 is mounted on a shaft 341, having bearings in a sleeve 342 on the end of an arm 343 extending from a sleeve 344 having bearings on the shaft 268. Sprocket chain 345 connects the forwarding roll 340 with the shaft 268, to drive the forwarding roll as in the upper mechanism. The roll 340 is located below the guide member 337, and the bottom of the latter is formed with an aperture 346 to permit the roll to contact the tape within the member 337. Directly above the aperture 346 the guide member 337 is provided with a transverse portion 347 forming a backing for the tape, where contacted by the forwarding roll, and a spring 348 holds the forwarding roll in operative position.

On the opposite side of the cut-off knives a single continuous guide strip is provided for supporting the severed section of the tape until grasped by the grippers 302—303. This supporting guide strip comprises straight end portions 349—350 which are in alignment, a central arched portion 351 which holds the tape in close proximity to the central portion of the periphery of the cylinder 295, and intermediate portions 352 which are depressed to clear the grippers 302 and 303 as they pass. The end of the strip portion 349 adjacent the knives is curved downwardly as at 353 to assure the end of the tape passing above the guide.

A shaft 354 having its ends supported in the legs R—R is arranged below the guide strip 349—350, and mounted thereon are two similar clamps 355—355, each having an upwardly extending arm 356 to which are adjustably secured the vertical components of angle arms 357, the horizontal components thereof being attached to the guide strip as by brazing.

Also mounted on said shaft 354 is a clamp block 358, to which is adjustably secured a drag spring 359, which extends upwardly into close proximity to the cylinder 295, and has the same function as the upper drag spring 318, above described.

*The upper cut-off mechanism*

The upper cut-off mechanism is shown in Figs. 1, 2a, 4, 34 and 35, and illustrated in detail in Figs. 26 to 28 inclusive. This mechanism is arranged directly behind the tape guides 304 and 314, and comprises generally parallel upper and lower shafts, a knife holder and knife on each of said shafts, and intermeshing segmental gears on said knife holders; together with a frame for said mechanism, a bracket for supporting said frame, and means for oscillating one of said shafts upon each revolution of the cylinder 264.

Referring particularly to Figs. 26, 27 and 28 of the drawings, 360 and 361 indicate said upper and lower shafts respectively, which are mounted in vertical members 362 of a frame comprising said members and an integral base plate 363. The frame is supported by a bracket 364, which comprises a horizontal shelf portion 365 upon which the base plate 363 is secured, and a depending member 366 extending downwardly to the rear of the shaft 296 and secured to the inner face of the frame member $A^1$. The bracket also includes a forwardly projecting flange 367 which rests upon and is secured to the top of the shaft bearing 298 as by a screw 368; and the front edge of the shelf 365 is recessed as at 369 to facilitate setting said screw before the base plate 363 is placed in position.

The shafts 360 and 361 are parallel with the path of the tape, and are substantially equal distances above and below the plane of said path, respectively.

Bushings 370 are provided in the members 362 for the oscillating lower shaft 361; and the end of said shaft toward the forwarding roll 327 extends beyond the adjacent member 362 to receive a cam roller arm 371 such as illustrated in Figs. 32 and 33. As shown therein, said arm is formed with a clamp 372 for adjustably securing the same to the shaft. A collar 373 is interposed between the clamp 372 and the frame member 362, and a collar 374 abutting the inner end of the bushing 370 and fixed to the shaft prevents longitudinal movement of the shaft.

Mounted on the shaft 361 is a knife holder comprising a sleeve 376 having an integral, forwardly extending arm 377 at one end and a segmental gear 378 at the opposite end. The gear 378 is split as at 379 and provided with a screw 380 forming a clamp for adjustably securing the sleeve to the shaft. A set screw 381 threaded through the gear and engaging a flat face 382 extending longitudinally of the shaft maintains the knife holder in proper radial position on the shaft irrespective of any longitudinal adjustment thereon. Fixed to the inner side of the arm 377 is the lower knife blade 383.

The upper shaft 360 is fixed in the supporting members 362 as by screws 384; and mounted to oscillate on said shaft is the upper knife holder, which comprises a sleeve 385 having a bushing 386, a forwardly extending knife arm 387, and a segmental gear 388 meshing with the segmental gear 378. A knife 389 is secured to the arm 387. Fixed to the shaft 360 is a collar 390, and fixed to the sleeve 385 is a laterally extending yoke 391 comprising a transverse plate 392 and tapered arms 393, the plate having an aperture 394 through which the shaft 360 extends. Interposed between the plate portion 392 of the yoke and the collar 390 is a compression spring 395, which holds the knife 389 in yielding contact with the knife 383, to ensure a clean shearing cut.

The knife arms 377 and 387, and the knives carried thereby, extend transversely of the path of the upper tape $X^1$ and between the adjacent ends of the tape guides 304 and 314; and are normally held in open or separated position to allow the tape to pass freely between them.

The adjacent end of the cylinder shaft 296 projects beyond the bearing 298, as at 396, and on said projecting end is mounted a disc cam 397 which is rotatably fixed to the shaft by a clamp 398; and fixed to the periphery of said disc is a radial projection 399. Mounted on the end of the arm 371 is a cam roller 400 which rides on the periphery of the disc 397; and a tension spring 401 connected at one end to a lug 402 on the end of arm 371, and at the other end to a pin 403 on the bracket 364, maintains the roller in contact with the disc, and the knives separated as above stated.

The disc 397 rotates with the cylinder, and upon each rotation thereof the projection 399 of the cam raises the arm 371 and actuates the knives to sever a section of the tape.

*The lower cut-off mechanism*

The lower cut-off mechanism is similar in general to the upper cut-off mechanism above described; and is illustrated in detail in Figs. 29 to 31 inclusive.

The frame for the mechanism is identical with the upper frame, and consists of a base plate 404 and upright end members 405. The plate 404 is secured to a cross flange $R^1$ of the inner leg R of the machine, and is further supported by a bracket 406 attached to the inner face of the leg R and having a horizontal portion 407 under the base plate 404 and secured thereto as by a screw 408.

In this lower cut-off mechanism the bottom shaft 409 is fixed in the bearings as by screws 410; and the upper shaft 411 is mounted to oscillate in bushings 412 in the uprights 405. The lower knife holder comprises a sleeve 413 mounted on the shaft 409 and provided with a bushing 414, a segmental gear 415 at one end of the sleeve, and a forwardly projecting arm 416 to which the lower knife 417 is secured.

The upper knife holder comprises a sleeve 418 having a segmental gear 419 at one end and a forwardly projecting arm 420 to which is attached the upper knife 421. The upper shaft 411 extends beyond the adjacent supporting member 405 and on said extended end is a cam roller arm 371 secured thereto by a clamp 372 as in the upper cut-off mechanism, with a collar 422 interposed between said arm and the frame. Said arm and a collar 423 abutting the end of the bushing 412 and fixed to the shaft 411 prevent longitudinal movement of the shaft. Mounted on the shaft 409 is a collar 424 between which and the knife arm 415 is interposed a spring 425 for maintaining the knife 417 in yielding contact with the knife 421.

The gear 419 is formed with a clamp 426 similar to that of the gear 378; and is also provided with a screw 427, which engages a flat face 428 extending longitudinally on the shaft 411 to maintain the knife holder in proper angular position on the shaft.

The inner end of the shaft 297 of the lower cylinder 295 extends to adjacent the shaft 275 of the lower draw roll mechanism, and is provided with a miter gear 429, which meshes with the miter gear 277 hereinbefore described. A thrust bearing 430 for the shaft 297 is arranged adjacent the inner shaft bearing 299. See Fig. 34.

Intermediate the gear 429 and thrust bearing 430 is a cam disc 431 rotatably fixed to the shaft by a clamp 432. The disc has a radial projection 433 similar to the projection 399 on the disc 397; and the arm 371 is provided with a cam engaging roller 434. A tension spring 435 connected at one end to a lug 436 on the arm 371, and at the other end to a pin 437 fixed to the leg R, maintains the roller in constant engagement with the periphery of the cam disc 431.

In the operation of the machine the cylinders are continuously rotated in opposite directions, as indicated by the arrows in Fig. 35; and the tapes $X^1$ are continuously fed to the cylinders by the draw rolls and forwarding rolls hereinbefore described.

After the forward sections of the tapes have been severed ready to be carried by the cylinders to the folding and attaching means hereinafter described, the knives are opened or separated to permit the forward ends of the tapes to pass without interruption.

In order to prevent the upper knife of each cut-off mechanism when retracted, from raising the unsevered end of the tape out of its horizontal path, suitable strippers are provided. Each stripper comprises a supporting clamp 438 and a depending tongue of sheet metal bent to form an attaching end 439 fixed to the clamp, a horizontal portion 440 spanning the upper knife arm, a vertical portion 441 and a reversely bent lower end 442 extending under the knife arm and terminating in close proximity to the upper knife.

The upper clamp 438 is supported on the shaft 310; and the lower clamp 438 is supported on a stud shaft 443 extending inwardly from a transverse portion R¹ of the adjacent leg R.

The cutting elements of the cut-off mechanisms are adjustable on their respective shafts in order to determine the length of the sections to be severed from the tape; and the construction of the strippers as above described permits maximum adjustment thereof as the stripper tongue may extend under the bracket 309 and the portion R¹ of the leg when the respective clamps 438 are moved to their fullest extent.

As the cylinders are rotated at a constant speed, the speed of the draw rolls must be variable in order to feed the determined length of tape thereto before severing the same. It is for this purpose that the pinion 279 of the draw roll mechanisms is interchangeable with a pinion of a different size as hereinbefore described.

Also supported on the stud shaft is a deflector for directing the advancing end of the tape beneath the lower cylinder and onto the guide 349. This comprises a clamp 444 on the shaft 443, and a depending tongue 445 having a downwardly and forwardly inclined lower end 446. See Fig. 34.

*The handle folding cylinders and gripper cam*

The folding cylinders 294 and 295 each comprises a cylindrical outer wall 447, a hub 448 and a central web 449. Extending through said web and journaled in brackets 450 on the inner face of the wall 447 is a gripper shaft 451. The outer faces of the brackets are preferably flush with the edges of the wall 447, and mounted upon said shaft are a pair of gripper clamps 452 upon which the grippers 302—303 are mounted. The clamps 452 bear against the inner faces of the brackets 450, thereby preventing longitudinal movement of the shaft 451; and each clamp comprises a block 453, split at one side of the shaft and provided with a screw 454 for adjustably clamping the block on the shaft. Extending outwardly from the forward portion of the block 453 is a lug 455 to which the gripper is detachably connected.

Each gripper 302—303 comprises a plate 456 constituting a jaw for clamping the tape X¹ to the peripheral surface of the cylinder, and a shank 457 which is secured to the rear face of the lug 455, as by a screw 458. The shank 457 is preferably of the same width as the gripper clamp block 452, as shown in Fig. 56, and is provided with flanges 459, which engage upon opposite sides of the lug 455, and prevent lateral movement of the jaw.

The plate 456 extends laterally from the shank and terminates in the plane of the outer edge of the cylinder upon which it is mounted, and also extends forwardly of the shank a distance substantially equal to the width of the tape. The outer portion of the forward edge is formed at an angle to the edge of the cylinder and is beveled as indicated at 460. The edges of the cylinders are cut away, as at 461, to a depth equal to the width of the grippers, and of sufficient length peripherally to permit proper swing to the same.

One end of the shaft 451 extends outwardly as at 462, and upon said end is clamped an arm 463 carrying a cam engaging roller 464, which travels upon the periphery of a cam disc 465 mounted upon the shaft 296 or 297, of the respective cylinder. The cam 465 has a hub 466 provided with a bushing 467, and is prevented from rotation by a cam stud 468 mounted upon a cam holder plate 469 fixed to the frame member A. The end of the stud 468 opposite from the plate 469 abuts the cam and is attached thereto as by a screw 470.

The cam 465 comprises a semi-circular portion 471 of comparatively small radius, a substantially semi-circular portion 472 of larger radius, and inclined portions 473 and 474 respectively, connecting the adjacent ends of the portions 471 and 472. A spring 475 having one end connected to the arm 463 and the other end secured to a pin 476 projecting outwardly from the cylinder web 449 holds the roller 464 in constant engagement with the periphery of the cam.

When the roller 464 is in engagement with the portion 468 of the cam, the grippers are held in open position as shown in Fig. 35, which illustrates the gripper in position just prior to engaging the tape X¹. Further movement of the cylinder permits the roller to ride down the portion 465, thereby operating the grippers to clamp the tape against the face of the cylinder.

Centered approximately 45° behind the grippers on the cylinder 294 are elongated press blocks 477 arranged in a recess 478 extending inwardly from the opposite edges of the cylinder and with the outer faces of the blocks flush with said edges. The blocks 477 have arcuate outer portions 479 projecting beyond the periphery of the cylinder and the inner edges of the blocks are rabbeted as at 480 to lie flush with the peripheral face of the cylinder, leaving the projecting portions of a width substantially equal to that of the tape X¹ from which the handles are to be made. Lugs 481 on the ends of the press blocks engage the inner face of the cylinder wall to limit the outward movement of the blocks.

Radially disposed spring pins 482 have their outer ends 483 extending into sockets 484 in the center of the inner portions of said press blocks, and their inner ends extending into radial bores 485 in the hub 448. An integral collar 486 is provided on each of said pins between which and the hub is arranged a compression spring 487. A holder plate 488 extends transversely of said cylinder, through an aperture 489 in the web 449, and is provided adjacent its ends with apertures 490 to receive the ends 483 of the pins 482 and prevent lateral displacement of the blocks.

The lower cylinder 295 is provided with a press block 491. This comprises an arcuate strip of metal of the same length and width as the arcuate outer portion 479 of the press block 477, and similarly located with relation to the adjacent grippers. The block 491 is rigidly secured to the cylinder as by screws 492.

*The cylinder side plates and folding cams*

A tie rod 493 connects the paste dish frames W adjacent their upper ends, and a like tie rod 494 connects said frames at the lower ends thereof. Near the horizontal center of the machine and equidistant above and below the same are rods 495 and 496 respectively, the ends of which are seated in the front end portions of the frame members A—A¹.

Arranged at the opposite sides of the upper cylinder 294 are cylinder side plates 497 supported upon the rods 493 and 495; and upon opposite sides of the lower cylinder are similar side plates 498 supported upon the rods 494 and 496.

Each side plate 497 and 498 has an arcuate rear edge 499 concentric with the axis of the cylinder with which it is associated, but of smaller radius so that the plates considerably overlap the cylinder edges as shown in Figs. 35, 52, 67 and 69. The front edge 500 of the side plates are preferably vertical and in advance of the cylinders. The outer faces of the plates 497 and 498, adjacent their forward edges, are provided with collars 501, by which the plates are fixed to the supporting rods.

The upper edges 502 of the upper side plates 497, and the lower edges 503 of the similar lower plates 498, are horizontal and in planes which intersect the peripheries of the cylinders 294—295 adjacent the upper and lower portions thereof, respectively.

Fixed to the side plates and projecting inwardly therefrom are handle folders 504. Each folder is formed of an angle bar comprising a vertically disposed flange 505 fixed to the outer face of the respective side plate, and a horizontal flange 506 extending over the edge 502 or 503, and projecting over the path of the outer portion of the gripper plates 456.

The horizontal flange 506 is cut back to form a curved cam edge 507 and a projecting tongue 508, the end of which extends into close proximity to the path of the outer face of the press block on the cylinder, as shown in Fig. 67.

The operation of the handle folding mechanism is as follows: After the grippers 302 and 303 have clamped the mid-portion $x2$ of the severed tape sections to the periphery of the cylinders, and carried the same past the drag springs 318 or 359, the laterally projecting ends $x3$ of the tape are brought into engagement with the cams 507 of the folders, which fold said ends inwardly and backwardly over the angular forward edges 460 of the laterally projecting portions of the gripper plates 456 as illustrated in dotted lines in Fig. 57. The folded ends then trail behind the grippers and are maintained at right angles to the mid-section by the cylinder side plates and the tongues 508 which engage the opposite edges of said ends, until the diagonal folds $x6$ between the portions $x2$ and $x3$ are definitely creased. The definite crease at $x5$ is imparted to the folded strip by special handle press rolls.

The handle press rolls

The handle press rolls are shown in Figs. 2a and 4 and illustrated in detail in Figs. 35 and 36. Mounted in bearings 509 in the frame members W—W is a shaft 510, which is located in a plane below the folders 504. On the shaft 510 are two press roll holders arranged respectively directly in front of the paths of the outer ends of the grippers and the trailing ends of the tapes. Each holder comprises an elongated member 511 having a bore 512 to receive the shaft 510. One end of the member 511 constitutes a clamp 513 for securing the holder in adjusted position on the shaft; and the opposite, and longer end, is formed with a recess 514 to receive a rubber block 515. The recess 514 extends from side to side of the arm end, and is closed at the ends by removable plates 516 which hold the blocks 515 therein. The block 515 constitutes a press roll, and has a cylindrical outer face 517 which engages the fold $x6$ and positively creases the same.

The outer end of the shaft 510 extends beyond the adjacent bearing 509, and mounted on said end is a pinion 518 which meshes with the gear 300 on the cylinder shaft 296. A clamp 519 adjustably mounted on the shaft and fixed to the pinion 318 by a pin 520 affords means for synchronizing the press rolls with the grippers on the cylinder.

The lower press roll mechanism is identical in construction and operation as the above described upper press roll mechanism, and consists in a shaft 521, press roll holders 522, and press roll 523. The end of the shaft 521 is provided with a pinion 524 meshing with the gear 301 on the lower cylinder shaft 297, and adjustably secured to the shaft 521 by a clamp 525.

The press rolls above described make four revolutions to each revolution of the cylinders 294—295 with which they are associated; but the contacting faces of the rolls and the cylinder travel at substantially the same peripheral speed. By referring to Fig. 57 of the drawings, it will be noted that the angularly disposed portion of the forward edge of the grippers over which the tape is folded is at a greater angle to the cylinder edge than the 45° angle fold of the tape, so that the folded edge $x6$ extends forwardly of the gripper. By this arrangement, the press rolls will press the tape at the fold $x6$ firmly against the cylinder and thereby more positively crease the fold than would be possible if the gripper fit within the angle of the fold.

The upper handle pasting mechanism

After the tape has been folded to form the handles, as above described, the trailing ends $x4$ of the tape will rest on the press blocks 477 and 491 of the upper and lower cylinders respectively; and means are provided to apply paste to the portions resting on said block for attaching the handles to the bags. This is accomplished by means of paste rolls to which the paste is fed from suitable paste dishes.

Referring to the upper portion of the machine, 526 indicates a shaft upon which are mounted a pair of paste rollers 527. See Figs. 35, 44, 48 and 49. The ends of the shaft 526 are reduced in diameter as at 528, and said reduced ends are mounted eccentrically in sleeves 529 having bearings 530 in the frames W. The sleeves 529 are formed with levers 531 by which they may be rotated in the bearings to adjust the distance between the rollers 527 and the press block 477; and the levers are provided with arcuate slots 532 for clamp screws 533 whereby the sleeves may be secured in adjusted position. The outer end of the shaft extends beyond the sleeve and mounted thereon is a pinion 534 which meshes with the cylinder gear 300. See Fig. 1. The pinion 534 is fixed to the shaft by means of a clamp 535 to which it is attached by a threaded pin 536.

A clamp 537 is provided for each roller 527 to adjustably secure the roller to the shaft, and a threaded pin or screw 538 secures the clamp to the roller. Each paste roller 527 has a peripheral segment 539 of substantially 90°, or of a length equal to that of the area to which the paste is to be applied to the tape. The remainder of the roller is of less diameter as indicated at 540.

Mounted upon the upper face of the forward extensions $W^1$ of the frame members W is a transversely extending paste dish bar 541, which supports the upper paste dish 542. See Figs. 35, 50, 60 and 61. The paste dish 542 is provided with base flanges 543 which rest upon said bar, and screws 544 extending through slots 545 in the base flanges adjustably secure the dishes in position. Fixed to the rear edge of the bar 541 are upwardly projecting stop plates 546, and threaded through said plates are set screws 547 which impinge against the base flanges 543.

The paste dish 542 is provided at its upper lateral edges with bearings 548 for a shaft 549 upon which is secured a paste roll 550. A scraper plate 551 is secured to lateral flanges 552 at the upper edges of the paste dish and is adjustable toward and from the roll 550 to regulate the quantity of paste delivered by the roll.

On the outer end of the bar 541 is an upwardly extending bracket 553 having an elongated bearing sleeve 554 in which is mounted a stud shaft 555 in alignment with the roller shaft 549. A coupling sleeve 556 is mounted on the inner end of the shaft 555 and provided with a longitudinal slot 557 to receive a pin 558 on the shaft whereby the sleeve is longitudinally slidable on but rotatably fixed to the shaft. The inner end of the sleeve 556 is provided with a bayonet joint slot 559 to receive a pin 560 on the shaft 549. By this construction the roller shaft 549 and roller 550 may be removed without disturbing the stub shaft 555.

A pinion 561 is fixed to the outer end of the stud shaft, and a collar 562 on the shaft, and engaging the inner end of the bearing 554 prevents longitudinal movement of the shaft.

An intermediate paste roll 563 is mounted on a shaft 564 journaled in eccentric sleeves 565 having bearings 566 in the frame members W. The sleeves 565 have lever arms 567 similar to the levers 531 of the bearing sleeves 529, which provides means for adjusting the intermediate roller 563 with relation to the roller 550 and the paste rollers 527. Fixed to the shaft 564 is a pinion 568 which meshes with the pinions 534 and 561 on the shafts 526 and 555, respectively.

When the machine is in operation the rolls 550 and 563, and the rollers 527, will be driven in the directions indicated by the arrows in Figs. 62 and 65, and a coating of paste will be raised from the paste pot 542 on the periphery of the roll 550. The scraper plate 551 will spread the coating evenly on the roll; and the adjustment of the plate 551 will determine the quantity of paste permitted to pass to the intermediate roll 563, to be taken therefrom by the segments 539 of the rollers 527.

The rollers 527 are timed to make four revolutions for each revolution of the cylinder 294 in order to maintain a uniform peripheral speed therewith, and are synchronized with the cylinder so that the paste applying segments 539 will cooperate with the press block 477 upon each fourth revolution of the rollers.

In order to prevent accumulation of paste on the rollers 527 during the three idle revolutions thereof, a paste doctor is provided for each roller, which are actuated by a cam rotatable with the folding cylinder 294.

Mounted in bearings 569 in the frame members W—W is a rock shaft 570 upon which are loosely mounted a pair of supporting brackets 571 for the paste doctors 572 respectively. Each bracket includes a pair of parallel spaced arms 573 having bores adjacent their ends to receive the shaft 570. Each doctor 572 comprises an elongated plate provided at its upper portion with slots 574 to receive screws 575 by which it is adjustably secured to its bracket 573. The lower end of the plate is curved outwardly and bifurcated forming curved fingers 576, which closely engage the sides of the rollers adjacent their peripheries and remove any accumulated paste therefrom. The edge 577 at the base of the bifurcation is adapted to engage the periphery of the roller during the three idle revolutions, as will be more fully described.

Located on the shaft 570 between the arms 574 is an actuating member comprising a clamp 578, by which it may be adjustably fixed to the shaft, and a depending portion 579 having a recess 580 in which a spring 581 is seated. The outer end of the spring impinges against the doctor 572 and tends to maintain the edge 577 in engagement with the periphery of the roller. The body of the bracket 571 is spaced from the adjacent face of the clamp to permit relative movement of the parts, and a lug 582 at the upper end of the clamp 578 limits such movement.

The end of the shaft 570 projects beyond the outer bearing 569, and to said projecting end is secured a lever clamp 583 to which is fixed an elongated lever 584. The outer end of the lever is provided with a roller 585, which rides on the periphery of a cam disc 586 fixed to the cylinder gear 300, as by screws 587.

The cam 586 comprises a peripheral portion 588 of greater radius, a portion 589 of lesser radius, and connecting segments 590. The portion 589 is substantially 90° and is engaged by the roller 585 during the active revolution of the paste roller 527 when applying paste to the handles; and the remainder of the periphery engages the roller 585 during the three idle revolutions thereof.

When the portion 589 of the cam is in engagement with the lever roller 585, the lever 584 is raised tilting the clamp block upwardly. At such time, which is during the idle revolutions mentioned, the edge 577 of the doctor plate is held in yielding engagement with the periphery of the paste roller, so that it rides on both segments 539 and 540, of the rollers, thereby scraping the paste therefrom, which drops into the rear portion of the paste dish 542.

When the lever roller 585 is engaged by the cam segment 589, the lever drops, tilting the clamp member 578. This brings the lug 582 into engagement with the upper end of the doctor and throws the edge 577 out of engagement with the roller. Paste may then be transferred from the intermediate roll 563 to the bag handles by the segment 539.

*The lower handle pasting mechanism*

The lower handle pasting mechanism is in the main similar to the upper pasting mechanism with variations necessitated by the location, and by the opposite direction of rotation of the associated folding cylinder 295.

The pasting rollers 591 are identical with the rollers 527, having a paste applying segment 592 of substantially a quarter circumference, and the remainder of less diameter. The rollers 592 are adjustably mounted on a shaft 593 having bearings in eccentric sleeves 594, which are mounted in bearings 595 in frame members W—W. The outer end of the shaft 593 is provided with a pinion 596 adjustably secured thereto by a clamp 597, and meshing with the gear 301 on the shaft of the lower folding cylinder 295.

Seated on lower forward extensions W² of the frame members W—W is a paste dish bar 598 upon which the lower paste dish 599 is mounted. The paste dish is provided with bearings 600 for a shaft 601, upon which a paste roll 602 is mounted. A stud shaft 603 is mounted in a bracket 603¹ on the bar 598 and is coupled to the shaft 601 by means identical with the coupling between the shafts of the upper paste dish, and therefor detail description is superfluous. The outer end of the stud shaft 603 is provided with a pinion 604 meshing directly with the pinion 596 on the paste roller shaft 593.

The lower pasting mechanism just described is in all respects similar to the corresponding features of the upper pasting mechanism except that the intermediate paste roll 563 is omitted and the paste dish is located so that the roll 602 will transfer the paste directly to the segments 592 of the rollers 591. By this arrangement, the paste roll will be rotated in the same direction as the roller 550, although the folding cylinder gear from which it derives its motion rotates in the opposite direction than the gear 300.

A rock shaft 605 mounted in bearings 606 in the frame members W—W is arranged above the paste roll 602, and loosely mounted on said shaft are supporting brackets 607 for paste doctors 608, together with the actuating members 609. The brackets 607 and actuating members 609 are identical in construction and operation with the corresponding brackets 571 and clamps 578 described in detail in conjunction with the upper paste mechanism. Adjustably secured to the outer end of the shaft 605 is a lever clamp 610 to which is fixed a lever 611, upon the end of which is a roller 612 engaging the periphery of a cam disc 613 identical with the cam disc 586 and secured to the gear 301 of the lower folding cylinder 295.

The doctor 608 comprises an elongated plate provided at the upper portion with slots 614 to receive screws 615 by which it is adjustably attached to its respective bracket 607; and as this is identical with the manner of mounting the doctors 572, further description and illustration is deemed superfluous. Each of the plates 608 is further provided with an elongated opening 616 to receive a peripheral portion of the roller 591, as illustrated in Fig. 65. The lower portion 617 of the opening is substantially the width of the roller so that the lateral edges thereof will continuously scrape the outer faces of the rollers and prevent accumulation of paste thereon; and the lower edge 618 is adapted to engage the peripheral edge of the roller during the three idle rotations thereof and remove the paste therefrom, which will drop into the rear portion of the paste dish.

When the roller 612 is engaged by the section 589 of the cam 613, the shaft 605 is rocked to tilt the doctors, as shown in full lines in Fig. 65, and the edges 618 are disengaged from the peripheries of the respective rollers permitting the segment 539 to accumulate paste thereon for transfer to the handles. When the lever 611 is raised into the position shown in dotted lines in Fig. 65, which is during the three idle rotations of the rollers 591, the edge 618 will be held in yielding engagement with the periphery of the rollers and prevent accumulation of paste thereon.

The drag springs and pivoted guides

In order to prevent the folded, trailing portions of the tape from contact with the paste rollers except when applying paste to the ends resting on the press blocks, and to maintain said ends in proper lateral position on said blocks to receive the paste, a combined drag spring and tape guiding device is provided between the handle press rolls 515 and the paste rollers 527. Each of said devices comprises a block supported on a side plate 497 or 498, a flat spring fixed at one end to the block with its lower end bearing against the adjacent folding cylinder, and a guide member pivoted at the inner end of the block and adapted to engage the edge of the tape remote from the side plate.

Referring particularly to Figs. 67 to 71 inclusive, 619 indicates the block which is substantially cylindrical and provided at one end with a threaded stem 620, which extends through an aperture in the side plate 497 or 498 and held in position by a nut 621. Projecting from the inner end of the block 619 is a stud 622 coaxial therewith.

The block 619 is arranged adjacent the periphery of the folding cylinder, and on the side remote from the cylinder is provided with a flat face 623. The drag spring 624 is formed of a strip of flat spring metal of substantially the width of the tape $X^1$, and bent to form a flat end 625, which is seated on the face 623, an arched portion 626 of greater radius than the block and extending over the same, and a straight portion 627 extending in the direction of rotation of the cylinder and terminating in a curved end 628 which bears against the periphery of the cylinder in close proximity to the paste rollers 527. The end 625 of the spring is clamped between the flat face 623 of the block and a plate 629 secured thereto by screws 630. See Fig. 71.

As the cylinders rotate, the trailing portions $x^3$ of the folded handles are drawn under the spring 624 by the grippers, and the spring will press said handle portions against the cylinder and out of contact with the paste rollers, as shown in Fig. 67. As the presser blocks 477 or 491 reach the springs, springs will flex sufficiently for the blocks with the ends of the tapes thereon to pass, but will hold the tapes firmly against the outer faces of the blocks.

In order to hold the tapes in position laterally on the blocks to receive the paste, a guide member is pivotably mounted on the stud 622 between the end of the block 619 and a collar 631 secured on the stud by a screw 632, the end of which projects outwardly from the collar. The guide member, which is best shown in Fig. 68, comprises a disc portion 633 having a bore to receive the stud 622, and a finger 634 extending substantially tangentially therefrom into close proximity to the cylinder 294 or 295. The disc 633 is provided with a detent 635, which normally engages a lug 636 projecting from the plate 629; and a coiled spring 637 extending about the periphery of the collar 631, and having its ends attached respectively to the projecting end of the screw 632 and to a pin 638 extending laterally from the finger 634, yieldingly holds the guide finger in normal position.

The pivoted guide members are spaced inwardly from the side plates 497 so as to just clear the projecting portions of the press blocks and thereby confine the tape ends between the fingers 634 and said plates, and in proper position to receive the paste from the rollers 527.

After the paste has been applied to the trailing portions of the tapes, said portions are carried toward the center of the machine between the side plates 497 or 498, and guide plates 639 and 640, which are supported upon the rods 495 and 496 respectively.

The guide plates 639 and 640 extend from adjacent the paste rollers 527 and 591 respectively to adjacent the area of nearest approach of the cylinders 294 and 295; and are provided with clamps 641 and 642 whereby they are adjustably secured to the supporting rods. The arcuate inner edges 643 and 644 of the upper and lower guide plates are concentric with the respective cylinders and spaced from the peripheries thereof sufficiently to clear the gripper plates 456, as shown in Figs. 67 and 68.

The handles are now ready to be attached to the preformed bags, which are fed through the machine between the cylinders 294 and 295.

The bag feeding mechanism

The preformed bags to which the handles are to be attached are fed toward the cylinders 294—295 on a horizontal feed table, which includes the supporting rails Y—Y, a pair of laterally spaced feeder rails 645, and means for moving the bags successively thereon. See Figs. 1, 5 to 7, 35 and 39.

As hereinbefore stated, the supporting rails Y—Y extend forwardly from the frame members W—W and are connected near their forward ends by a tie rod Z. The rails Y are formed of angle bars comprising vertical inner flanges $y$ having their inner faces in alignment with the inner faces of the frame members X, and horizontal outwardly extending upper flanges $y^1$.

The feeder rails 645 comprise a pair of angle bars consisting of inwardly extending horizontal flanges 646, upon which the lateral edges of the folded bags $x^5$ are supported, and upwardly extending outer guide flanges 647. The upper faces of the flanges 646 lie in a horizontal plane midway between the folding cylinders, and said rails 645 extend from above the apron $Y^1$ at the forward ends of the rails Y, to and beyond the vertical plane of the axes of the folding cylinders.

The rails 645 are supported upon brackets 648 mounted upon the tie rod Z, and similar brackets 649 mounted upon a transverse rod 650, having its ends seated in the frame members W. The flanges 646 are fixed to the upper ends of the brackets by any suitable means, and the inner edges thereof adjacent the folding cylinders are preferably cut back or reduced in width as at 651. See Fig. 5. The lower ends of the brackets 648 and 649 constitute clamps 652, by which the brackets are adjustably secured to the respective shafts. By this construction the feeder rails may be adjusted laterally to accommodate bags of different widths.

Loosely mounted on the rod 496 between collars 653 is a sprocket gear 654; and a larger sprocket gear 655 is mounted on a shaft 656 having bearings in blocks 657 fixed to the under faces of the flange $y^1$ of the supporting rails at the forward ends thereof. An endless sprocket chain 658 is mounted upon the sprockets 654 and 655, and is provided with a follower or pusher 659 for moving the bags forwardly to the handle attaching means.

The upper lap of the chain 658 is supported on a slide bar 671, the upper edge of which is rabbeted as at 672 for the lower edges of the chain links to keep the chain tracked thereon. The bar 671 extends from adjacent the sprocket 655 to adjacent the sprocket 654, and is supported by the rods Z and 650, which extend through the same. Collars 673 and 674 on the rods Z and 650 respectively hold the bar 671 in position.

One end of the shaft 656 extends beyond the support Y and is provided with a sprocket 675 connected by a chain 676 with a sprocket 677 on a stud shaft 678 mounted on the outer frame W. Rotatable with the sprocket 678 is a pinion 679 which meshes with the pinion 596. The sprocket 655 is mounted between a collar 680 and a clamp 681 connected thereto, and by means of which the sprocket is normally rotatably fixed to the shaft. By loosening the clamp 681, the sprocket 655 may be readily rotated on the shaft to position the pusher 659 to synchronize the bag feeding mechanism to the folding and pasting mechanisms.

In practice, flatly folded bags $x^5$ are fed by hand or otherwise to the feed table by placing the lateral edges of the bags on the supporting flanges 646 of the feeder rails and with the open end of the bag toward the cylinders. The pusher 659 engages the closed end or bottom of the bag and pushes the bag between the cylinders 294, 295 in time for the press blocks 477 and 491 to press the pasted portions of the handles onto the opposite sides of the bag.

In traveling along the feeder rails to the cylinders, the bags must pass under the paste dish bar 541 and the cross rod 495; and to prevent the open ends of the bags from contacting said elements, a pair of deflectors are provided. Each deflector consists of a block 682 attached to the bar 541 and a rod 683 brazed or otherwise secured to the under face of the block, and having an upturned forward end portion 684. The rear end of the rod extends under the bar 541 to adjacent the rod 495 and deflects the bag ends beneath the same. Also, the forward portions of the adjacent edges of the upper and lower side plates 497 and 498, and also of the guide plates 639 and 640, converge rearwardly, as at 685, to compress the bags sufficiently to ensure proper entry between the cylinders.

The handle strippers

At the time when the press blocks 477 and 491 are pressing the portions $x^4$ of the handles to which paste has been applied, into contact with the opposite sides of a bag, the rollers 464 of the gripper mechanisms reach the portions 474 and 472 of the cams 465 thereby retracting the grippers and releasing the handles therefrom. As soon as the handles are released, strippers engage the centers of the grip portion $x^2$ thereof and quickly move the handles out of the path of the gripper jaws and deflect them toward the delivery mechanism.

The upper stripper comprises a triangular plate 686 supported with the apex of the triangle in close proximity to the peripheral face of the cylinder 294 immediately beyond the position where the grippers release the handle. The inclined under edge 687 of the stripper deflects the handle downwardly into close proximity to the discharge mechanism. The stripper plate 686 is supported upon the vertical end 688 of a bar 689 which curves upwardly and rearwardly and has its opposite end fixed to the tie rod G of the cylinder frame. See Fig. 4.

The lower stripper comprises a triangular plate 690 having a base flange 691 secured to a transverse stripper bar 692 extending transversely of the frame and having its ends supported upon angle irons 693 fixed to the inner faces of the lower portion of the frame members A—$A^1$. See Figs. 5 and 35. The acute forward end of plate 690 lies in close proximity to the periphery of the cylinder 295 immediately beyond the position where the grippers release the handles from the cylinder; and the upwardly inclined edge thereof deflects the handle released by the lower grippers upwardly out of the path of the grippers and toward the discharge mechanism.

The discharge mechanism

The discharge mechanism comprises generally superposed endless conveyor belts between the adjacent normally contacting laps of which the bags are received from the handle applying means and the strippers. Preferably, two pairs of belts are provided, which are spaced apart laterally and mounted upon rollers.

Directly behind the strippers are upper and lower rollers 694 and 695, mounted upon shafts 696 and 697 respectively having bearings in the frame members A—A¹; and mounted in bearings 698 and 699 fixed to the end flanges D of said frame members are shafts 700 and 701 of idle rollers 702 and 703 respectively. Mounted on the upper rollers 694 and 702 are a pair of endless belts 704; and a pair of similar belts 705 are mounted on the lower rollers 695 and 703.

It should be noted that when the completed shopping bags leave the cylinders and strippers, the handles precede the bags; and to facilitate the entry of the handles between the belts the rollers 694 and 695 are spaced apart sufficiently to provide an entry gap 706 between the upper and lower belts as shown in Fig. 35.

Extending from adjacent the forward rollers 694—695 to adjacent the rear rollers 702—703 is a flat plate 707, which constitutes a conveyor belt support upon which the upper laps of the lower belts travel, and which raises the same into contact with the lower laps of the upper belts. The plate 707 is secured to supporting transverse angle bars 708—709 fixed to the upper flanges of the girts E and F respectively, and the forward and rear edges of the plate are curved downwardly as at 710 and 711.

A take-up or tensioning device is provided for the lower belts, which comprises a roller 712 mounted in brackets 713 depending from the ends of a transversely extending angle bar 714. Extending upwardly from the center of the bar 714 is an arm 715 having a vertical slot 716 for a clamp screw 717 threaded into the web of the girt E, and a spacer 718 is provided between the girt and the arm 717, as shown in Figs. 1, 4 and 58.

Arranged between the laps of the upper belts 704 and resting upon the lower laps thereof is a roller 719 having a shaft 720 seated in the ends of arms 721 pivotally mounted on the tie rod H. Directly below the roller 719 is a roller 722 of less diameter, which engages the under faces of the upper laps of the lower belts 705 through an opening 723 in the plate 707. The roller 722 is carried by a shaft 724 having bearings 725 in brackets 726 secured to the inner faces of the frame members A—A¹.

As the grip portions $x^3$ of the handles are stripped from the folding cylinders as hereinbefore described, they are pushed between the adjacent laps of the discharge belts 704 and 705 through the gap 706 by the bag to which they have been attached, said bag still being between the press blocks of the cylinders. By the time the bag is released from between said blocks, the handles will be frictionally engaged between the discharge belts and will draw the bag between the belts. The completed bag will then be carried between the rollers 719 and 722 for a final pressing and then discharged from between the rollers 702 and 703. Intermeshing gears 727 and 728 are provided on the ends of the roller shafts 696 and 697 for actuating the discharge belts, and lateral shifting of the belts 704 is prevented by guide studs 729 extending upwardly from the tie rod G. The gear 728 meshes with the main drive gear 730 of the machine, and the discharge mechanism therefor derives its power directly therefrom.

The power and drive mechanism

The power for driving the machine may be acquired from any source, as from a motor 731 mounted under the frame of the device in a support not shown. The motor is connected by a belt 732 to a pulley 733 on the main drive shaft 734, is mounted in bearing blocks 735 depending from the bottom flanges B¹ of the frame elements A—A¹, and is equipped at its outer end with a hand wheel 736. The main drive gear 730 is mounted on the shaft 734 and meshes with the gear 728 of the discharge mechanism as above stated.

The gear 730 also meshes with the gear 301 of the lower folding cylinder, thereby driving the cylinders through the intermeshing gears 300, 301. The shaft 297 of the lower folding cylinder is provided on its inner end with the miter gear 429 hereinbefore described, which meshes with the miter gear 277 on the shaft 275 of the draw roll mechanism. See Fig. 24. A pinion 279 on the shaft 275 meshes with the intermediate gear 280, which in turn meshes with the pinion 283 on the lower draw roll shaft 271. The upper draw roll mechanism is connected to the lower mechanism by the sprocket gearing described in connection with the description of the draw roll mechanism and repetition would be superfluous.

A sprocket 260 on the shaft 252 of the draw roll mechanism is connected by a chain 261 to a sprocket 178 on shaft 156 of the squeeze roll mechanism, thereby driving said squeeze rolls as hereinbefore described. It will, therefore, be obvious that all the mechanisms of the device which form the three-ply tapes from the single-ply strips and feed said tapes to the folding cylinders derive their motion from the shaft of the lower folding cylinder, and are therefor synchronized therewith.

When it is desired to vary the length of the folded end portions $x^3$ of the handles by which they are attached to the bags, the speed of the tape forming mechanisms and of the draw rolls must be varied accordingly. The cylinders 294 and 295 rotate at a fixed speed, but a longer or shorter section of tape must be fed thereto in the time the cylinders take to make one revolution, and the knives of the tape severing means are adjusted toward or from the cylinders according to whether a shorter or longer handle is desired. The gear 279 on the shaft 275 is then removed and a smaller or larger gear substituted to vary the speed of the draw rolls; and the intermediate gear 280 adjusted in its arcuate mounting to mesh with the substituted gear.

The press rolls and paste rollers are geared to the cylinder gears 300 and 301, as described in conjunction with the several mechanisms, and need no further description. Also, the bag feeding mechanism derives its power from the pinion 679 meshing with the pinion 596, which in turn meshes with the gear 301, all as fully described in connection with said bag feeding mechanism.

It is obvious that various changes and modifications may be made in the machine above described, or in any of the several parts or details thereof without departing from the scope of the invention as defined by the accompanying claims.

We claim:

1. In a machine of the class described, a pair of folding cylinders mounted upon parallel axes, means for rotating said cylinders in opposite directions, means for feeding tapes transversely across said cylinders, means for severing sections of said tapes, grippers on said cylinders for gripping said severed sections respectively, stabilizing means cooperating with said grippers to fold said severed sections to form handles, each comprising a grip portion and angularly disposed end portions, means for feeding preformed bags between said cylinders, means for attaching said end portion to opposite sides of a bag as it passes between said cylinders, and means for delivering the bag with attached handles from the machine.

2. In a machine of the class described, a pair of similar folding cylinders mounted upon parallel axes, means for rotating said cylinders in opposite directions, means for feeding tapes transversely across said cylinders, means for severing sections from said tapes, grippers on said cylinders for gripping the severed sections respectively, means cooperating with said grippers to fold said severed sections to form handles, each comprising a grip portion and angularly disposed end portions, means for applying paste to parts of said end portions, means for feeding preformed bags between said cylinders, means on said cylinders for pressing the pasted portions of said handles into contact with a bag as it passes between said cylinders, means for stripping said handles from said cylinders, and means for delivering the bag with attached handles from said machine.

3. In a machine of the class described, a pair of similar folding cylinders mounted upon parallel axes, means for rotating said cylinders in opposite directions, means for feeding tapes transversely across said cylinders, means for severing sections from said tapes, grippers on said cylinders to grip the severed portions of said tapes, respectively, means cooperating with said grippers to fold said sections as the cylinders rotate, to form handles each comprising a grip portion and angularly disposed end portions, means for compressing the tapes at the folded portions, means for applying paste to parts of said end portions, means for feeding preformed bags between said cylinders, means on said cylinders for pressing the pasted parts of said handles into contact with the opposite sides of a bag as it passes between said cylinders.

4. In a machine of the class described, a pair of similar folding cylinders mounted upon parallel axes, means for rotating said cylinders in opposite directions, means for feeding tapes transversely across said cylinders, means for severing sections from said tapes, a pair of grippers on each of said cylinders to grip said severed sections, means cooperating with said grippers to fold said severed sections as the cylinders rotate to form handles each comprising a grip portion extending between the grippers and angularly disposed end portions, means for compressing the tapes at the folded portions, means for applying paste to parts of said end portions, means for feeding preformed bags between said cylinders, means on said cylinders for pressing the pasted parts of said handles into contact with opposite sides of a bag as it passes between said cylinders.

5. In a machine of the class described, a pair of similar folding cylinders mounted upon parallel axes, means for rotating said cylinders in opposite directions, means for feeding tapes transversely across said cylinders, means for severing sections from said tapes, a pair of grippers on each of said cylinders to grip said severed sections intermediate the ends thereof, means cooperating with said cylinders to fold the end portions of said sections over said grippers, and at substantially right angles to the portion between the grippers, the forward folding edges of the grippers being at a greater angle to the path of rotation than the angle of the folds of the tape, means for compressing the tapes at the fold, means for applying paste to parts of said end portions, means for feeding preformed bags between said cylinders, and means on said cylinders for pressing the pasted parts of said end portions into contact with opposite sides of a bag as it passes between said cylinders.

6. In a machine of the class described, a pair of similar folding cylinders mounted upon parallel axes, means for rotating said cylinders in opposite directions, means for feeding tapes transversely across said cylinders, means for severing sections from said tapes, a pair of grippers on each of said cylinders to grip said severed sections intermediate the ends thereof, means cooperating with said cylinders to fold the end portions of said sections over said grippers, and at substantially right angles to the portion between the grippers, the forward folding edges of the grippers being at a greater angle to the path of rotation than the angle of the folds of the tape, means for compressing the tapes at the fold, means for applying paste to parts of said end portions, means for feeding preformed bags between said cylinders, and cooperating means on said cylinders for yieldingly pressing the pasted parts of said end portions into contact with opposite sides of a bag as it passes between said cylinders.

7. In a machine of the class described, a pair of similar folding cylinders mounted upon parallel axes, means for rotating said cylinders in opposite directions, means for feeding tapes transversely across said cylinders, means for severing sections from said tapes, a pair of grippers on each of said cylinders to grip said sections respectively intermediate the ends thereof, means cooperating with said cylinders to fold the end portions of said sections over said grippers, and at substantially right angles to the portion between the grippers, means for maintaining said folded end portions in peripheral alignment behind said grippers, presser members on each of said cylinders in spaced relation behind said gripper to support the terminal ends of said folded sections, pasting discs for applying paste to the portions of said ends supported on said presser members, means for feeding preformed bags between said cylinders, said presser member being adapted to press the pasted portions of said ends into contact with the opposite sides of a bag as it passes between said cylinders.

8. In a machine of the class described, a pair of similar folding cylinders mounted upon parallel axes, means for rotating said cylinders in opposite directions, means for feeding tapes transversley across said cylinders, means for severing sections from said tapes, a pair of grippers on each of said cylinders adapted to grip said sections respectively intermediate the ends thereof, fixed cam members upon each side of each cylinder forward of the path of the feed of said tapes to the cylinders and adapted to fold the ends of said tape sections over said grippers and at substantially right angles to the portion between said grippers, presser members on each of said cylinders in spaced relation behind said grippers to support the terminal ends of said folded end sections, pasting discs for applying paste to the portions of said ends supported on said presser members, means for maintaining the folded ends in peripheral alignment between said grippers and said presser members, means for maintaining the portions of said folded ends between the grippers and presser members out of contact with said pasting discs, means for feeding bags between said cylinders.

9. In a machine of the class described, a pair of similar folding cylinders mounted on parallel axes and rotatable in opposite directions, means for feeding tapes transversely across said cylinders, means for severing sections from said tapes, a pair of grippers on each of said cylinders adapted to grip said sections respectively intermediate the ends thereof, cam members upon each side of each cylinder forward of the path of feed of said tapes to the cylinders, and adapted to fold the ends of said sections over said grippers and at substantially right angles to the portion between the grippers, presser members on each of said cylinders in spaced relation behind said grippers to support the terminal ends of said folded end sections, means for maintaining the folded end portions in peripheral alignment on the cylinders, said means comprising cylinder side plates in close proximity to the sides of said cylinders to engage the outer edge of said end portions and pivoted clogs to engage the inner edges of said end portions, pasting discs for applying paste to the portions of said ends supported on said presser members, means for maintaining the portions of said ends between said grippers and said presser members out of contact with said pasting discs and means for feeding preformed bags between said cylinders.

10. In a machine of the class described, a folding cylinder, means for rotating the same, means for feeding a tape transversely across the periphery of said cylinder, means for severing the section of the tape extending across said cylinder, a pair of laterally spaced grippers on said cylinder adapted to grip said tape section intermediate its ends, a flexible drag spring fixedly supported substantially midway between the paths of said grippers to maintain the severed section in position until grasped by the grippers, and folding cams adapted to be engaged by the end portions of said strip to fold said portions backwardly over said grippers.

11. In a machine of the class described, the combination of a pair of adjacent similar folding cylinders mounted upon parallel axes and adapted to rotate in opposite directions, a pair of draw roll mechanisms adapted to feed a pair of tapes transversely across diametrically opposite portions of the peripheries of said folding cylinders respectively, and means for maintaining said strips in lateral parallelism as they approach said draw roll mechanisms.

12. In a machine of the class described, the combination of a pair of adjacent similar folding cylinders mounted to rotate in opposite directions on parallel axes, a pair of similar draw roll mechanisms adapted to feed respectively a pair of tapes transversely across diametrically opposite portions of the peripheries of said cylinders, and means for maintaining said strips in parallelism as they approach the draw roll mechanisms, and means for directing the tapes to the respective draw mechanisms.

13. In a machine of the class described, a pair of folding cylinders mounted upon parallel axes, means for rotating said cylinders in opposite directions, means for feeding tapes transversely across said cylinders, means for severing the sections of the tape fed across said cylinders, means on said cylinders for gripping the severed sections intermediate the ends thereof, means cooperating with said cylinders to fold said severed sections to form handles, means for applying paste to portions of said handles, means for feeding preformed bags between said cylinders, means on said cylinders for pressing the pasted portions of the handles into contact with the opposite faces of a bag, means for actuating the gripping means to release the handles, and means for stripping the released handles from the cylinders.

14. In a bag handle forming machine, the combination of a cylinder having means for rotating it, means for feeding a flat tape endwise across the periphery of the cylinder, means for severing the portion of the tape extending across the periphery of the cylinder from the remainder of the tape to provide a handle section, grippers on the cylinder operative to grip said handle section at points between its ends and having fold defining edges thereon, and folders cooperative with the end portions of said handle section during rotation of the cylinder to fold its end portions over said fold defining edges of the grippers into angular relation with the intermediate portion thereof.

15. In a bag handle forming and applying machine, the combination of a cylinder having means for rotating it, means for feeding a flat tape across the periphery of the cylinder in the direction of the axis thereof, means for severing from the tape the portion thereof extending across the periphery of the cylinder to provide a handle section, grippers on the cylinder operative to grip said handle section in areas thereof between its ends and having fold defining edges extending obliquely to the direction of rotation of the cylinder, folders cooperative with the end portions of the handle section during rotation of the cylinder to fold said end portions over said fold defining edges of the grippers into angular relation to the intermediate portion of the handle section and into trailing relation with the grippers, and means for applying adhesive to said trailing end portions of the handle section.

16. In a bag handle forming and applying machine, the combination of a cylinder having means for rotating it, means for feeding a flat tape endwise into a position to extend across the periphery of the cylinder, means for severing from the tape the portion extending across the periphery of the cylinder to provide a handle section, a pair of grippers operative to clamp portions of the handle section between its ends against the periphery of the cylinder and having fold defining edges which converge toward the direction of movement of the periphery of the cylinder, folders cooperative with the end portions of the handle section to fold said end portions back and over said fold defining edges toward the periphery of the cylinder into angular relation with the intermediate portion of the handle section and into trailing relation with the grippers, means for applying adhesive to the trailing end portions of the handle section, and means for presenting a surface to said end portions of the handle section for adhesive attachment of said end portions thereto.

17. In a bag handle forming machine, the combination of a cylinder having means for rotating it, means for feeding a flat tape into a position to extend across the periphery and toward the respective ends of the cylinder, means for severing from the tape the portion extending across the periphery of the cylinder to provide a handle section, a pair of grippers mounted on the periphery of the cylinder and operative to grip the handle section in longitudinally spaced areas thereof and having fold defining edges thereon, folders operative to fold the end portions of the handle section over the grippers and fold defining edges into angular relation to the intermediate portion thereof, and members for pressing the portions of the tape which are folded over the grippers against the grippers and cylinder and thereby creasing the lines of fold between the intermediate portion and the end portions of the handle strip.

WILLIAM H. BOKENKROGER.
TRUE M. AVERY.

REFERENCES CITED

The following references are of record in the file of this patent:

UNITED STATES PATENTS

| Number | Name | Date |
| --- | --- | --- |
| 876,646 | Jamieson | Jan. 14, 1908 |
| 1,958,537 | Glass | May 15, 1934 |
| 2,060,450 | Steen | Nov. 10, 1936 |
| 2,061,286 | Millett | Nov. 17, 1936 |